March 20, 1956  G. VÁRKONYI ET AL  2,738,810
HIGH CAPACITY MECHANICAL LOOMS
Filed Aug. 1, 1951  15 Sheets-Sheet 1

INVENTORS
Gyula Várkonyi
Vidor Bokor
Geza Várkonyi
by Young, Emery & Thompson
attys.

March 20, 1956  G. VÁRKONYI ET AL  2,738,810
HIGH CAPACITY MECHANICAL LOOMS
Filed Aug. 1, 1951  15 Sheets-Sheet 2

INVENTORS
Gyula Varkonyi
Vidor Bokor
Geza Varkonyi
by: Young, Emery & Thompson
attys.

March 20, 1956 G. VÁRKONYI ET AL 2,738,810
HIGH CAPACITY MECHANICAL LOOMS
Filed Aug. 1, 1951 15 Sheets-Sheet 3
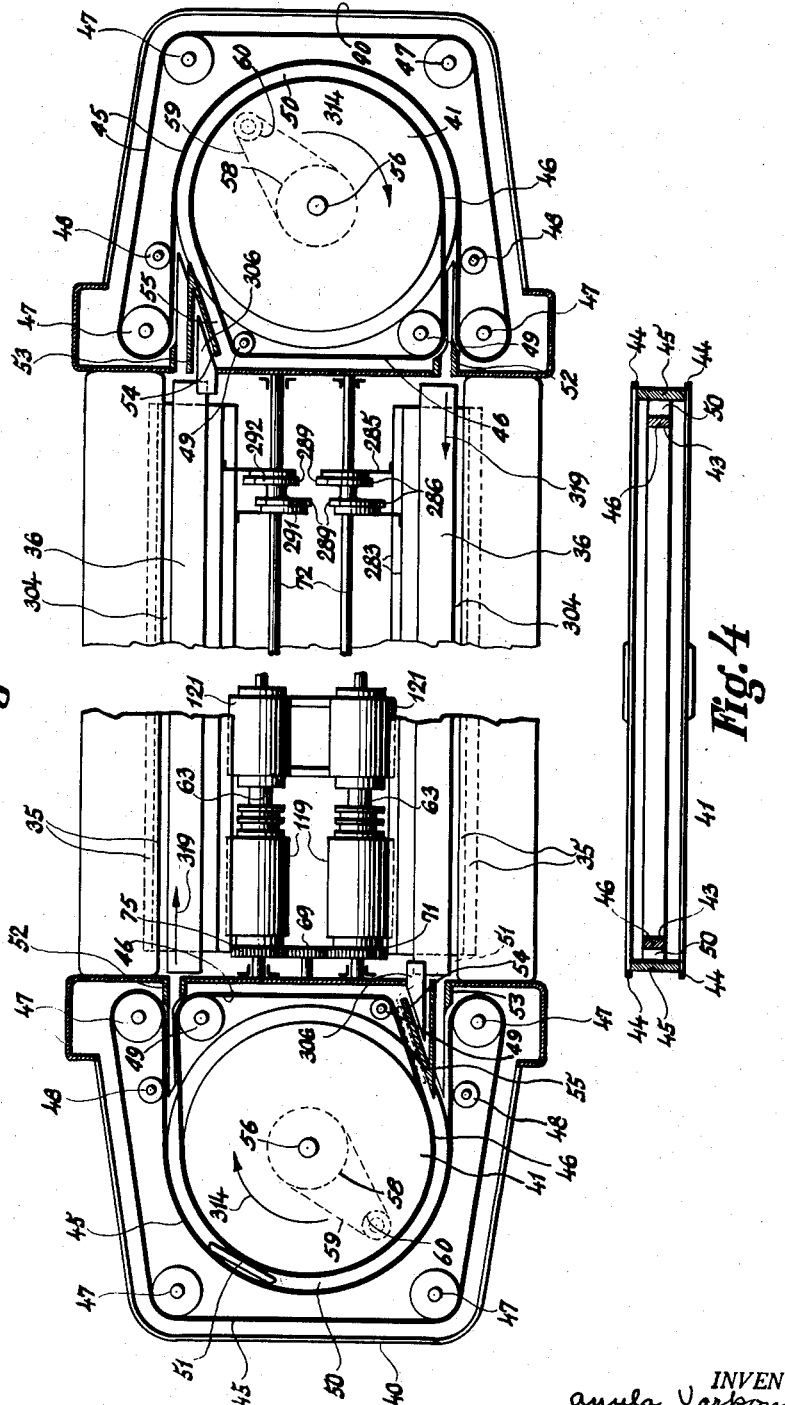
INVENTORS
Gyula Várkonyi
Vidor Bokor
Geza Várkonyi
by Young, Emery & Thompson
attys

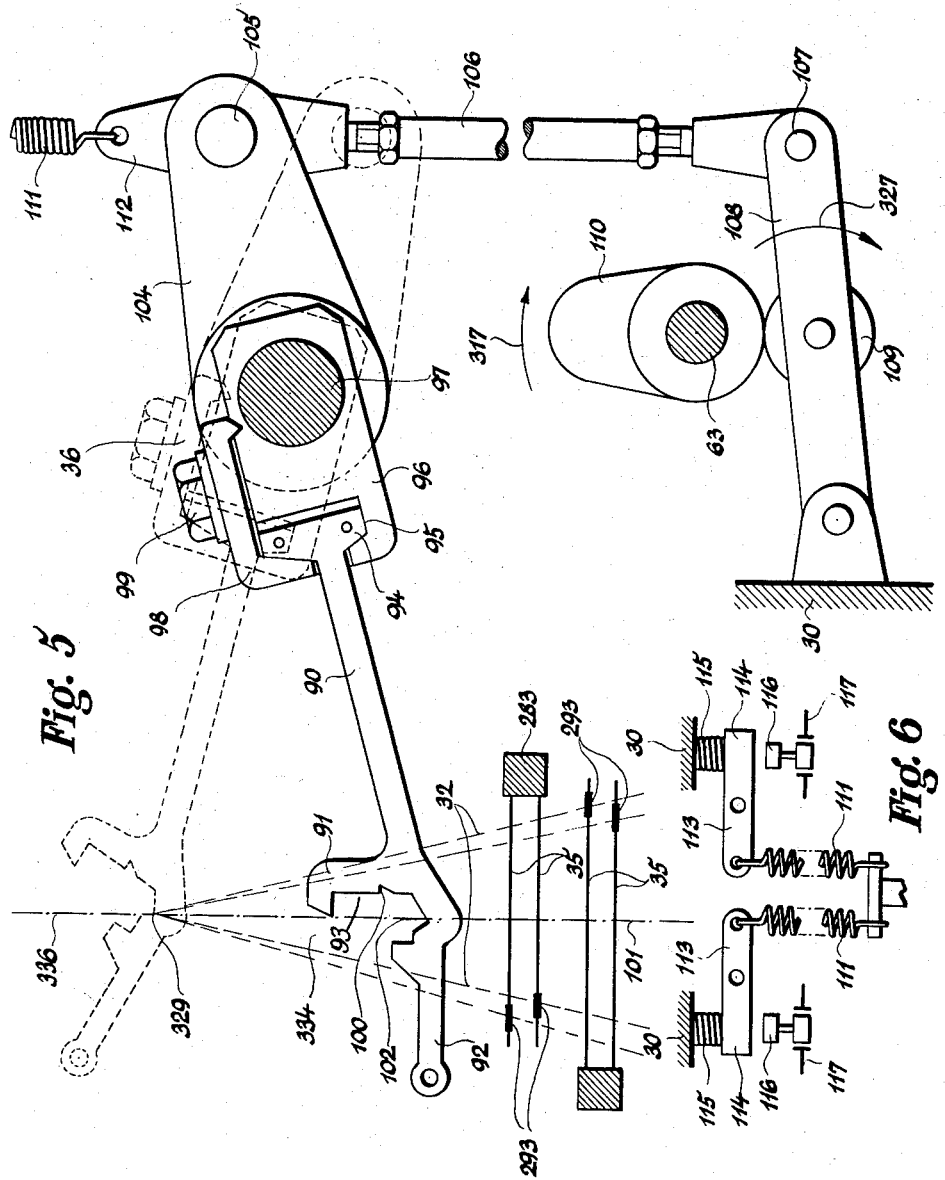

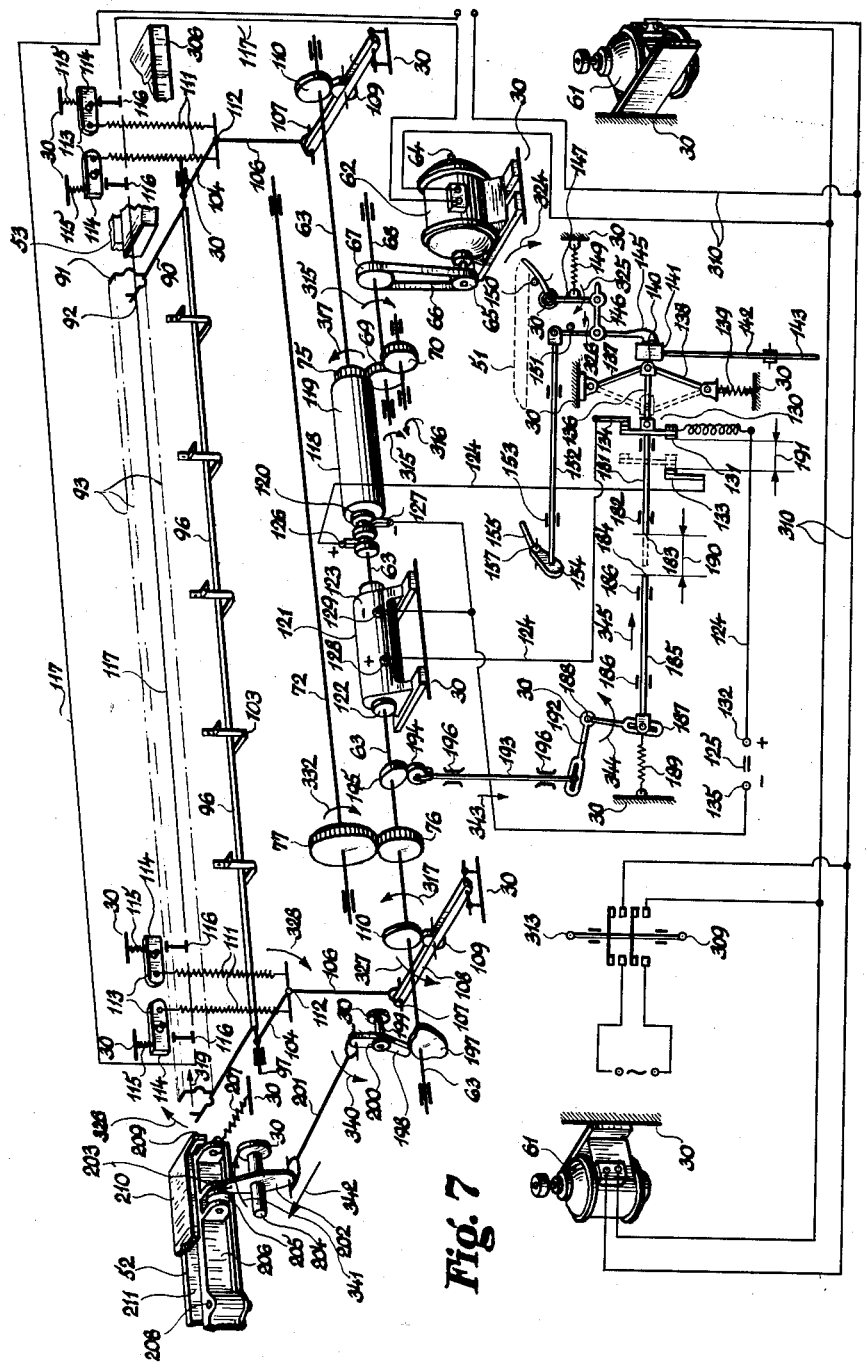

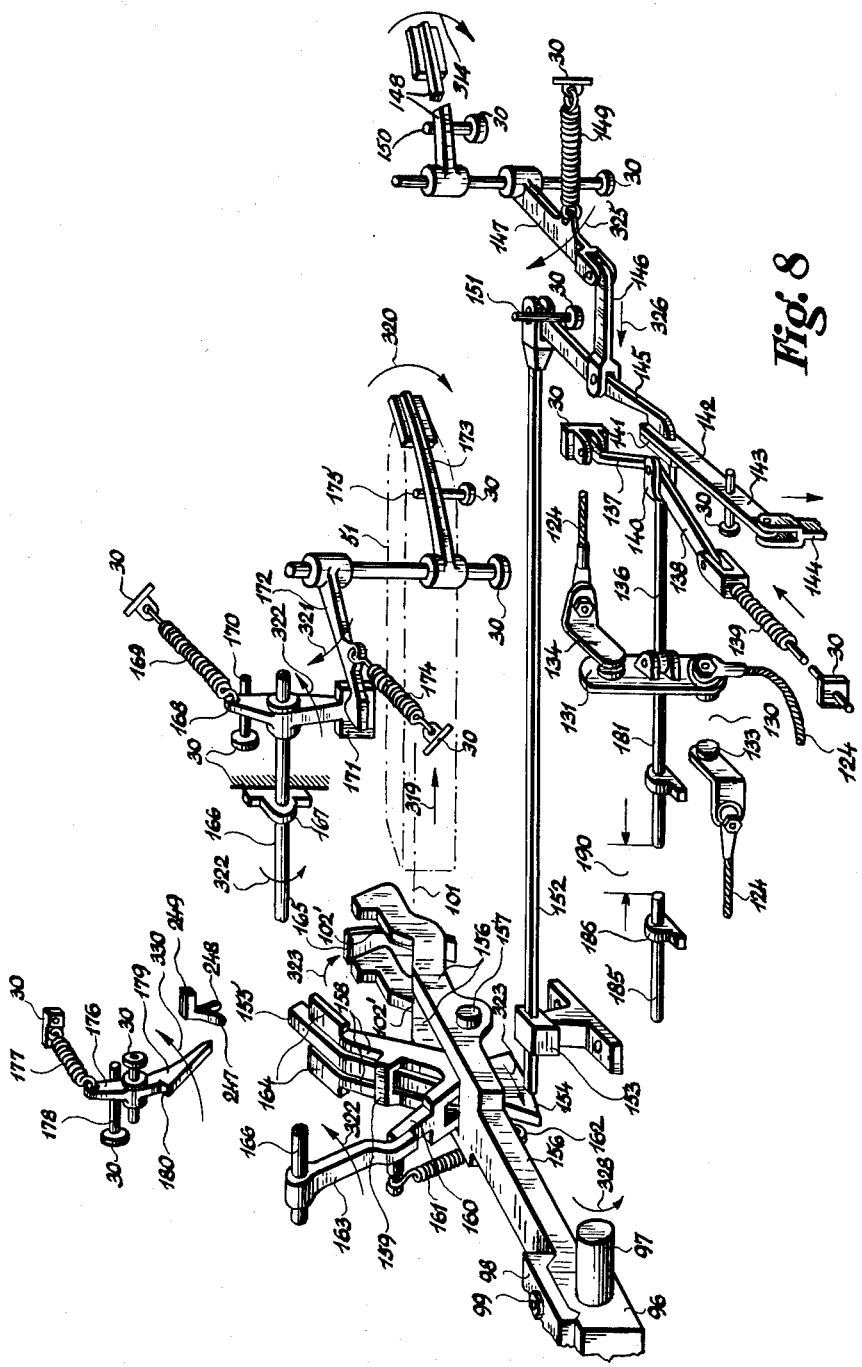

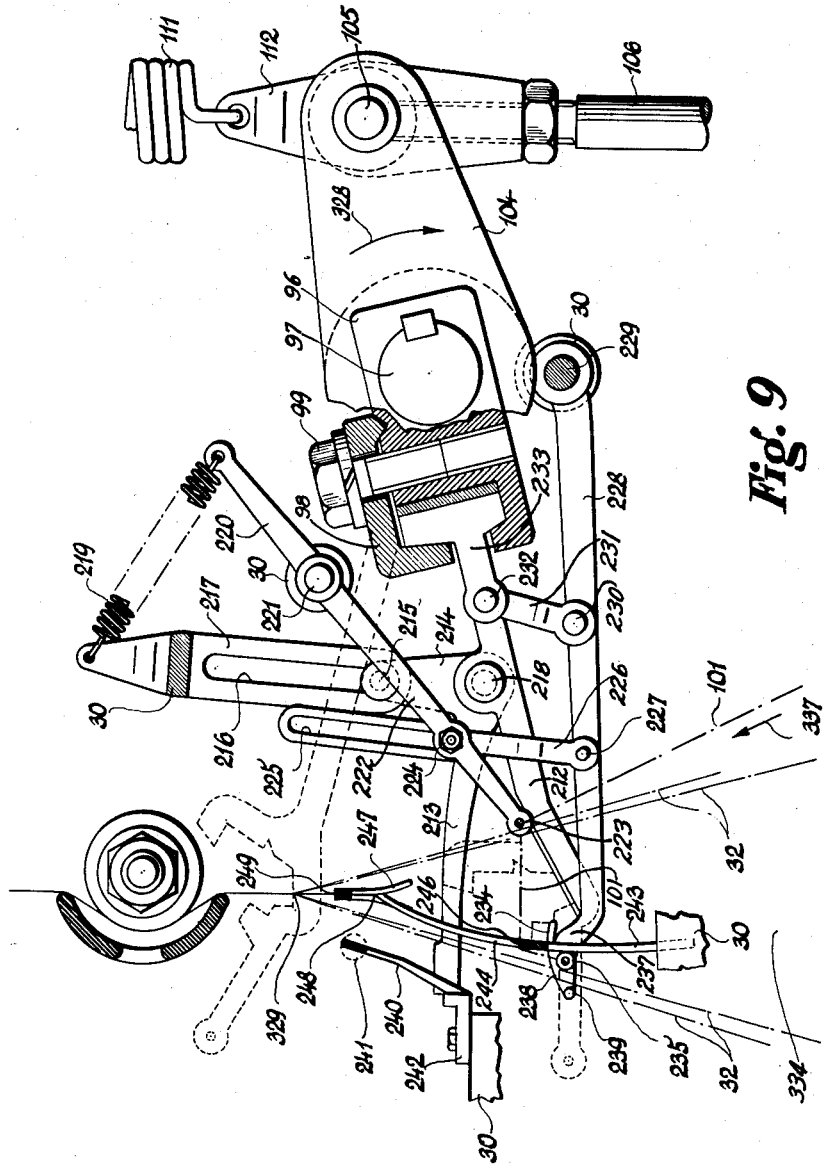

March 20, 1956  G. VÁRKONYI ET AL  2,738,810
HIGH CAPACITY MECHANICAL LOOMS
Filed Aug. 1, 1951  15 Sheets-Sheet 9

INVENTORS
Gyula Varkonyi
Vidor Bokor
Geza Varkonyi
by:
Young, Emery & Thompson
attys.

March 20, 1956  G. VÁRKONYI ET AL  2,738,810
HIGH CAPACITY MECHANICAL LOOMS
Filed Aug. 1, 1951  15 Sheets-Sheet 10

INVENTORS
Gyula Várkonyi
Vidor Bokor
Geza Várkonyi
by: Young, Emery & Thompson
attys.

March 20, 1956 G. VÁRKONYI ET AL 2,738,810
HIGH CAPACITY MECHANICAL LOOMS
Filed Aug. 1, 1951 15 Sheets-Sheet 12

INVENTORS
Gyula Varkonyi
Vidor Bokor
Geza Varkonyi
by: Young, Emery & Thompson
attys.

March 20, 1956 G. VÁRKONYI ET AL 2,738,810
HIGH CAPACITY MECHANICAL LOOMS
Filed Aug. 1, 1951 15 Sheets-Sheet 13

INVENTORS
Gyula Varkonyi
Vidor Bokor
Geza Varkonyi
by Young, Emery + Thompson
attys.

March 20, 1956  G. VÁRKONYI ET AL  2,738,810
HIGH CAPACITY MECHANICAL LOOMS
Filed Aug. 1, 1951  15 Sheets-Sheet 14
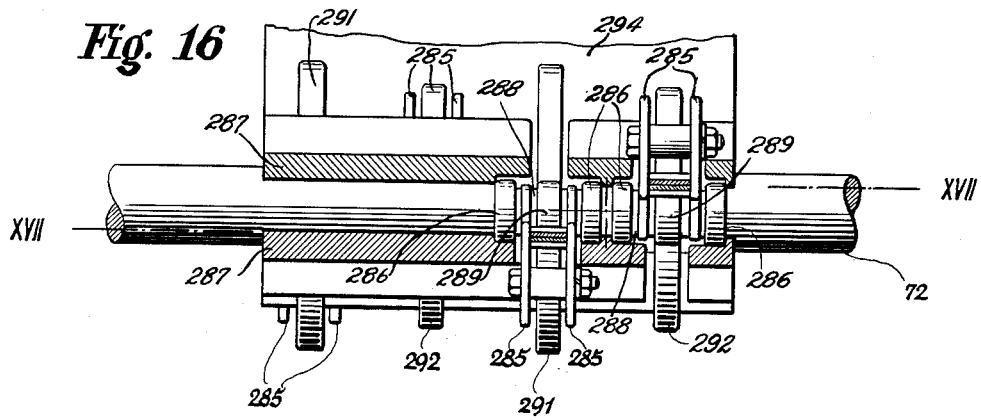
*Fig. 16*
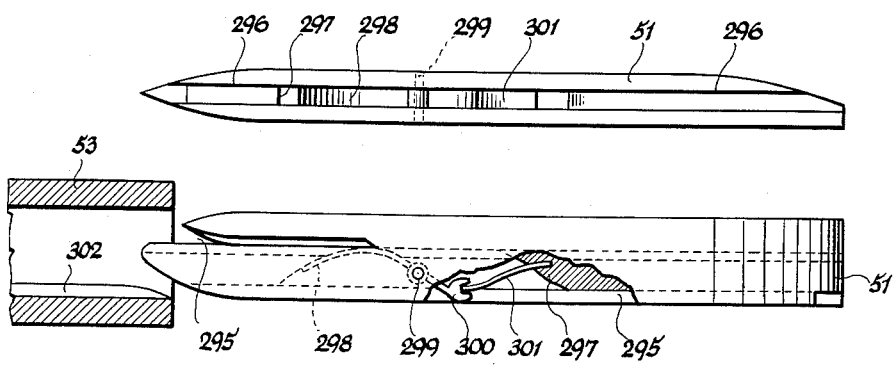
*Fig. 18*
*Fig. 19*
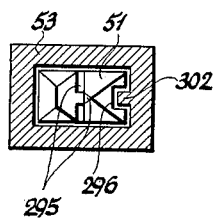
*Fig. 20*
INVENTORS
Gyula Varkonyi
Victor Bokor
Geza Varkonyi
by Young, Emery & Thompson
attys March 20, 1956 G. VÁRKONYI ET AL 2,738,810
HIGH CAPACITY MECHANICAL LOOMS
Filed Aug. 1, 1951 15 Sheets-Sheet 15

INVENTORS
Gyula Varkonyi
Vidor Bokor
Geza Varkonyi
by Young, Emery & Thompson
attys

United States Patent Office

2,738,810
Patented Mar. 20, 1956

2,738,810

HIGH CAPACITY MECHANICAL LOOMS

Gyula Várkonyi, Vidor Bokor, and Géza Várkonyi, Budapest, Hungary, assignors to "Licencia" Találmányokat Értékesito Vállalat, Budapest, Hungary Application August 1, 1951, Serial No. 239,702

Claims priority, application Hungary August 1, 1950

24 Claims. (Cl. 139—18)

This invention relates to a high capacity mechanical loom of the type comprising a gripping shuttle adapted to circulate through a shed.

As it is known in the art, such types of mechanical looms have great advantages as regards decrease of the mass forces and thereby increase of the number of picks and of the output which is rendered possible by having the shuttle or shuttles moved in a constant direction of circulation instead of shooting it in alternate directions through the shed. It is, however, difficult to operate the shuttle along a path returning in itself since either the shuttle path has a complicated form and the operation of the machine is cumbersome or the shuttle has to be reversed before it again crosses the shed.

It has already been suggested to guide the shuttle along a path which does not necessitate a reversion of the shuttle between two following shots. In this case the shuttle is shot by a picking mechanism through the shed and then allowed to drop on to a movable transport means which carries the shuttle back below the picking mechanism. Here another mechanism lifts the shuttle and engages it with the picking mechanism so as to be shot again through the shed. The shuttle passes thereby the return section of its path obviously without being reversed and, the shuttle path comprising straight sections only, there is no centrifugal force to be considered. However, apart from the application of a series of various drive means this arrangement has also the drawback that the straight return section of the shuttle path cannot be utilized for picking so as to arrange a second plane of weaving since the shuttle is returned in its original position wherein the shuttle point lies opposite to the direction of the shuttle motion. According to another known suggestion the shuttle is reversed after each picking by means of a circulated flexible band the outerside of which is provided with suction cups for holding the shuttle against the centrifugal force as long as it passes the curved return sections of its path. Thereafter the band undergoes a transverse bending whereby the suction cups release the shuttle which is shot by its inertia across the shed and engaged with the suction cups again. This system dispenses with the plurality of drive and transport means which are replaced by the flexible band and its operating means. Moreover, it works with inversion of the shuttle and thereby renders possible to form the loom as a twin machine. There are, however, difficulties which arise from arranging the shuttle on the outer side of the band conveyor and from holding it by suction effect against the centrifugal power. Special means for placing the shuttle on the conveyor band and for removing it therefrom are also indispensible and render the operation of the machine both slow and delicate. Also the band is exposed to a premature wear with regard to the double bending in longitudinal and transversal direction.

The main object of the present invention is to eliminate the above said drawbacks and to construct a mechanical loom reliably working with a shuttle which becomes reversed after having left the shed. The basic idea of the invention consists in that the centrifugal force, which has hitherto been excluded or counteracted, is made use of for assuring contact between the shuttle and its drive means. According to the main feature of the invention the shuttle is reversed along a path outside of the shed by drive means which are arranged along curved sections of the shuttle path so as to further the shuttle by contact under centrifugal action and thereby to impart speed to it for being shot across the shed.

An object of the invention consists in providing independent sources of power for imparting motion to the drive means on either side of the shed.

Another object of the invention is to provide flexible circulation means co-operating with a circumference of rotary means thereby enclosing a tunnel which is adapted to receive the shuttle.

Still another object of the invention is to form the rotary means as carrier wheels having a groove in their circumference, the tunnel for receiving the shuttle being enclosed by the groove and the flexible circulation means.

A further object of the invention is to provide either side of the carrier wheels with a flange for limiting transverse motions of the flexible circulation means in the curved sections of the shuttle path.

A still further object of the invention is to form the flexible circulation means as at least one outer belt which is in the curved sections of the shuttle path confined by guide means to the circumference of the carrier wheels.

Another object of the invention consists in providing inner belts co-operating each with a bottom surface of the groove in the circumference of one of the carrier wheels, the tunnel for receiving the shuttle in the curved sections of its path thus being enclosed by an outer belt and an inner belt as well as by the side walls of the groove.

Still another object of the invention is to have each carrier wheel co-operating with a separate outer belt.

A further object of the invention consists in providing a reed and drive means imparting intermittent beat up motion to the reed, the drive means being actuated by control means which are operated by the shuttle so as to cause beat up motions of the reed only after the shuttle has left the shed.

A still further object of the invention consists in actuating the drive means of the reed by electric control means.

Another object of the invention is to have the electric control means alternately operating an electro-magnetic clutch means and an electro-magnetic brake means which are inserted between a source of power and a shaft, and between this shaft and a stationary structure, respectively, the shaft imparting the intermittent beat up motion to the reed.

Still another object of the invention is to form the electric control means as a double-pole switch which is inserted between a source of current and the electro-magnetic means so as to be commutated by the shuttle, control means adapted to be actuated by the shaft being provided for readjusting the double-pole switch after it has been commutated by the shuttle.

Another object of the invention consists in providing feeler means for contacting with a thread, the feeler means being arranged so as to permit commutation of the double-pole switch only if the shuttle has brought a weft thread through the shed.

Still another object of the invention consists in providing a commutating mechanism comprising a double-armed lever one arm of which is adapted to be pushed by the shuttle against spring means; a swivel arm journalled to the other arm of the double-armed lever and adapted to displace a movable contact of the double-pole switch; displaceable abutments adapted to engage with the swivel arm and thereby to cause pivoting thereof so as to displace the movable contact when the double-armed lever is pivoted by the shuttle; and thread-feeler means adapted to disengage the displaceable abutments from the swivel arm if it does not contact with threads thereby preventing displacement of the movable contact.

A further object of the invention is to form the feeler means by a feeler member formed as another double-armed lever one arm of which is adapted to contact with a weft thread whereas the other arm thereof is formed as an abutment for engaging with the swivel arm, control means adapted to be actuated by the shuttle being provided for operating this feeler member, and by feeler members for contacting with warp threads and operating another displaceable abutment for engaging also with the swivel arm, both abutments in their engaging position being adapted to cause pivoting of the swivel arm so as to displace the movable contact when the double-armed lever co-operating with the shuttle is pivoted by the same, and all feeler members being arranged so as to disengage both abutments from the swivel arm if they do not contact with threads thereby preventing displacement of the movable contact, A still further object of the invention is to operate the drive means for reversing the shuttle and for imparting intermittent beat up motion to the reed, respectively, by independent sources of power.

Another object of the invention is to build up the reed of laminae having arms integral therewith and forming a tunnel-like race for guiding the shuttle, the laminae being supported by a shaft rotatably arranged against spring means which urge it so as to hold the reed out of its beat up position.

Still another object of the invention is to provide the laminae with enlarged bottom parts engaging with a groove of the shaft and fixed in their engaging position by attachment rails so that after removal of the attachment rails the laminae are exchangeable each without displacing the others.

A further object of the invention consists in providing a notch in the laminae between the arms thereof for receiving the weft thread when the shuttle passes the tunnel-like race.

A still further object of the invention consists in providing heddles actuated by positive control means, which are operated by the drive means imparting intermittent beat up motion to the reed in synchronism with the beat up motions thereof.

Another object of the invention is to support the heddles by movable frames connected to carriages rolling on a stationary structure, and to provide a shaft operating the heddles with cams keyed to it the edge of which co-operates with rollers supported by the carriages and arranged on either side of the shaft so as to impart positively controlled alternate motion to the frames.

Still another object of the invention is to provide the cams operating different frames with different excentricity so as to assure equal tension of warp threads when forming the shed.

A further object of the invention is to provide the gripping shuttle with a transverse slot at its front for guiding a weft thread, and with a thread gripper accommodated therein at the bottom section of the slot, spring means being connected to the shuttle for urging the thread gripper towards its gripping position, and displacing means being provided for removing the thread gripper from its gripping position against the spring means so as to release the weft thread when the shuttle passes the exit of the shed.

A still further object of the invention is to provide the shuttle with a longitudinal groove intersecting with the transverse slot, and to accommodate the thread gripper formed as a double-armed lever within this longitudinal groove at the bottom section of the slot, the spring means resting upon one arm of the thread gripper so as to urge its other arm against a wall of the slot, stationary means being provided for engaging with the longitudinal groove and abutting against the spring-loaded arm and thereby displacing the thread gripper from its gripping position against the spring means so as to release the weft thread when the shuttle passes the exit of the shed.

Another important object of the invention is to form the loom as a twin machine with two perpendicular weave planes, comprising two parallel systems of warp threads with proper heddles and reed and shed, and one gripping shuttle circulating through the sheds of both systems.

Still another object of the invention consists in providing common drive means for operating the reeds and heddles of both systems each of which has proper control means inserted between the common drive means and the reed and heddles, these proper control means being operated by the shuttle so as to permit actuating of the reeds and heddles only after the shuttle has left the respective shed and has brought a weft thread therethrough.

Further details will be described by taking reference to the accompanying drawings which show—by way of example—various embodiments of the invention, particularly:

Fig. 3 is a top view on a larger scale partly in section as indicated by line III—III in Fig. 1.

Fig. 4 shows a longitudinal sectional view of a carrier wheel.

Fig. 5 is a side elevational view showing a reed and parts of its drive mechanism.

Fig. 6 shows a front elevational view of a detail of the drive mechanism in Fig. 5.

Fig. 7 is a perspective view showing the diagrammatic arrangement of an entire drive mechanism of the reed.

Fig. 8 is a perspective detailed view of electric control means forming parts of the drive mechanism in Fig. 7.

Fig. 9 is a side elevational view of a mechanism guiding and cutting a weft thread on the inlet side of the reed.

Fig. 16 is a front elevational view partly in section of the mechanism shown in Fig. 15.

Fig. 18 is a bottom view of a shuttle according to the invention.

Fig. 19 is a side elevational view of the shuttle shown in Fig. 18 comprising a longitudinal sectional view of parts of the loom co-operating therewith.

Fig. 20 is a front elevational view of the shuttle with a sectional view of the detail shown in Fig. 19.

Similar parts are referred to by same numbers of reference throughout the drawings.

Figure 1:
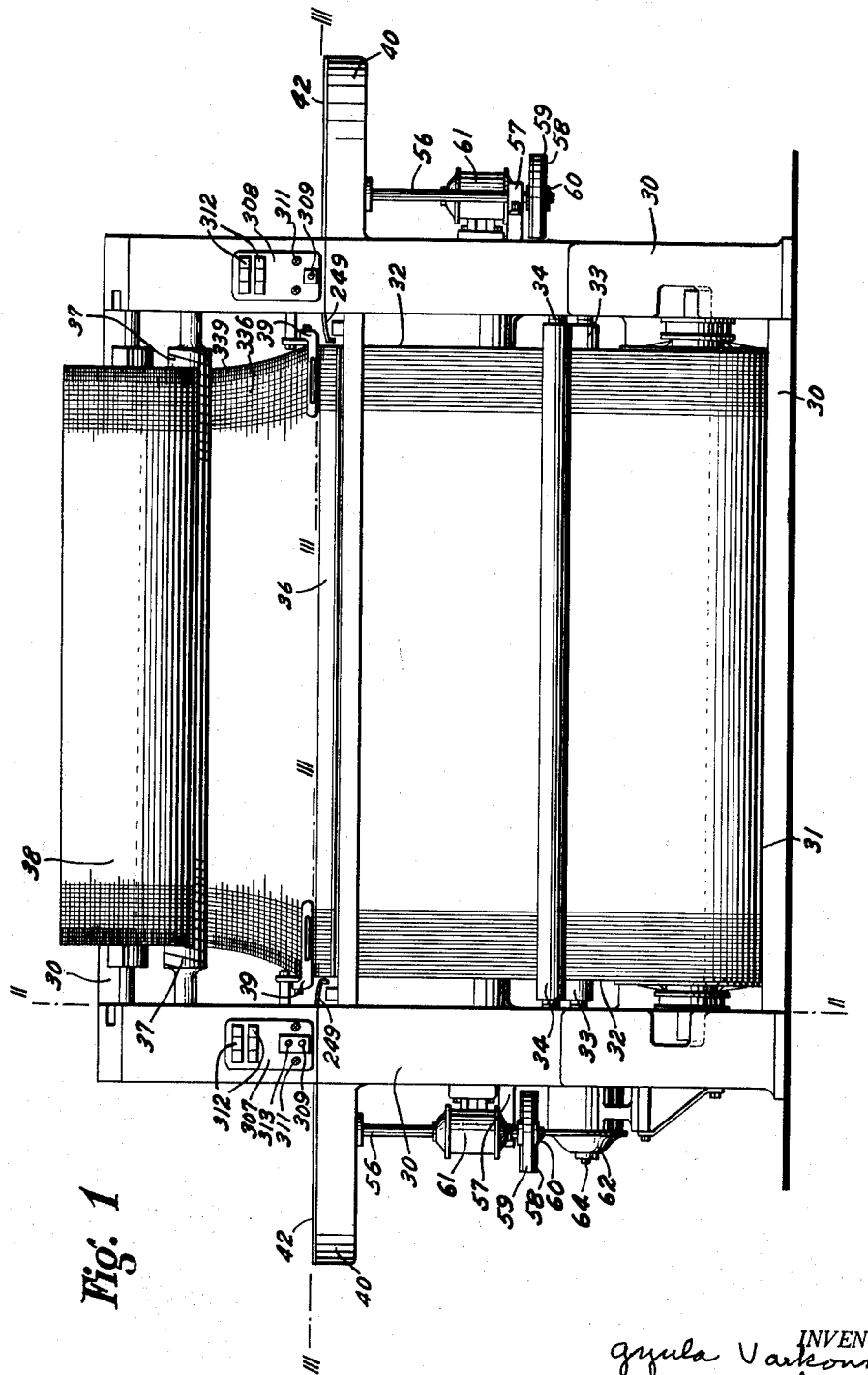
Fig. 1 is a front elevational view of a preferred embodiment of the high capacity mechanical loom for weaving according to the invention formed as a twin machine with two perpendicular planes of weaving.
Figure 2:
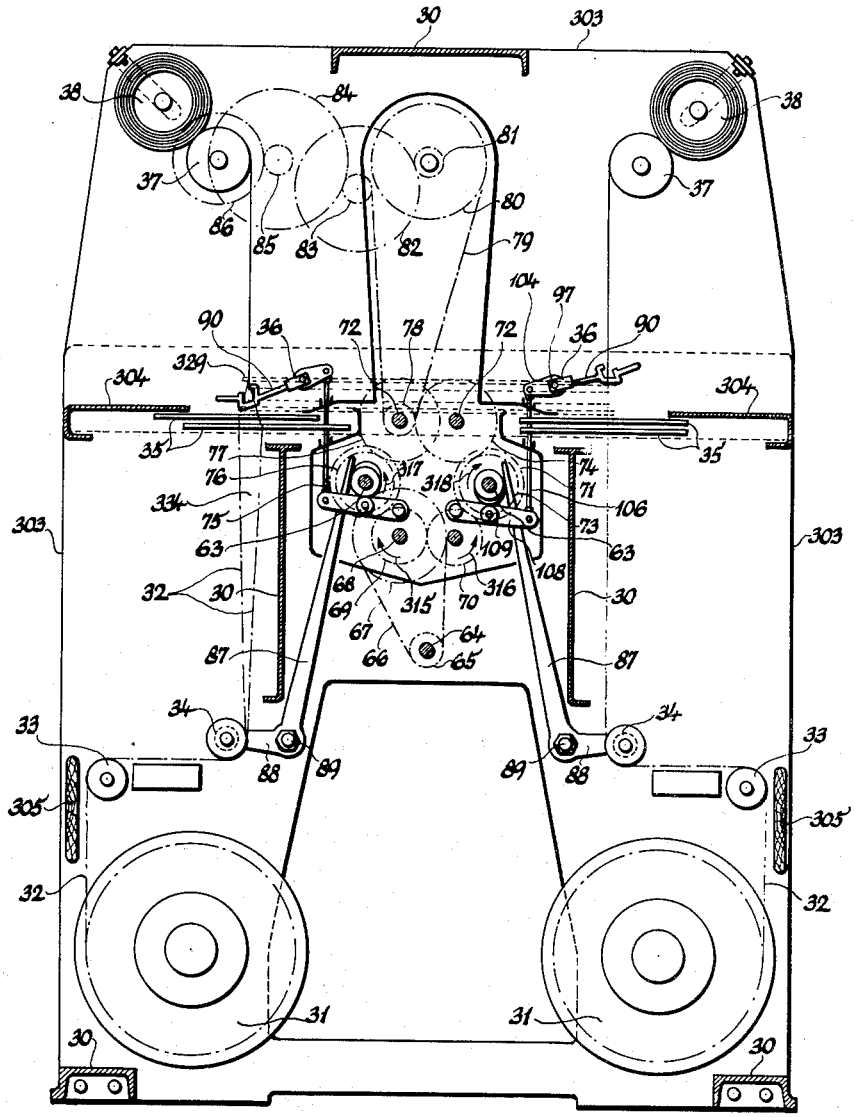
Fig. 2 is a cross sectional view according to line II—II of Fig. 1.

Referring more particularly to Figs. 1 to 3 frame 30 of the represented embodiment of the high capacity mechanical loom according to the invention supports warp beams 31 from which two perpendicular systems of warp threads 32 pass by means of carrier rollers 33 and tension rollers 34 through shed forming means such as heddles 35 and through reeds 36 along carrier rollers 37 on to cloth beams 38. Between reeds 36 and carrier rollers 37 the fabric passes through temples or spreaders 39 the form and operation of which is known per se and, therefore, not represented in the drawing as regards their details. At the level of the reeds 36 the frame 30 has two extensions 40 each formed as a casing for accommodating rotary means such as a carrier wheel 41 therein on either end of the machine. The casings 40 are closed by displaceable lids 42. The carrier wheels 41, more particularly shown in Fig. 4, have a groove 43 in their circumference and are provided with flanges 44 on either side thereof. Thus two guide surfaces are formed each of which co-operates with flexible circulation means such as a belt. In particular, the circumference of each of the carrier wheels 41 carries an outer belt 45 and their grooves 43 carry inner belts 46. Guide means such as belt pulleys 47 compel the outer belts 45 to contact with half of the circumference of the carrier wheels. Flapping of the belts 45 is damped by rollers 48. The inner belts 46 are guided by belt pulleys 49. Each pair of an outer belt 45 and an inner belt 46 encloses a tunnel 50 which is adapted to receive a single gripping shuttle 51 and forms a return section of the shuttle path. Obviously, said rotary means 41 and said flexible circulation means 45 and 46 form curved guide means which support the shuttle 51 outside of the shed and reverse it so as to circulate with its point ahead. While traveling through the shed, the shuttle 51 is supported by the reed 36 as will be described later. Between the tunnels 50 and the reeds 36 there are inlet tubes 52 and outlet tubes 53 for guiding the shuttle 51 from the tunnels 50 into the reeds 36 and vice versa, respectively. The outlet tubes 53 are provided with a wing 54 facing the inner belt 46 thereby forming an inlet passage 55 for putting the shuttle 51 into the machine. The carrier wheels 41 have shafts 56 which, below their radial bearings 57, carry belt pulleys 58. Each of the belt pulleys 58 is driven by means of a belt 59 and a further pulley 60 by a separate three-phase synchronous motor 61, e. g. of 0.65 horsepower, thereby rotating the shaft 56 and the carrier wheel 41 with a speed of about 1000 revolutions per minute independently from the other set of shuttle drive means. The size of the carrier wheels 41 is selected so as to impart a circulation speed of about 35 metres per secundum to the outer belts 45. A further electric motor 62, e. g. of 1.5 horsepower, is provided for operating the heddles 35 and the reeds 36 to which motion is imparted by means of main shafts 63. In particular, shaft 64 of the electric motor 62 carries a belt pulley 65 which rotates by means of a belt 66 a belt pulley 67 keyed to a shaft 68. A pinion 69 on shaft 68 transmits the rotation, on one hand, through camming pinions 70 and 71 to one of the main shafts 63 which, in turn, rotates a heddle shaft 72 associated therewith by means of camming pinions 73 and 74, and, on the other hand, through a pinion 75 to the other main shaft 63 which, in turn, rotates the other heddle shaft 72 by means of camming pinions 76 and 77. The proportions are selected so as to rotate main shafts 63 and heddle shafts 72 with 300 to 320 revolutions per minute and 150 to 160 revolutions per minute, respectively. Each of the heddle shafts 72 has a belt pulley 78 keyed to it which rotates by means of a belt 79 and a belt pulley 80 as well as by a series of camming pinions 81, 82, 83, 84, 85, 86 the carrier rollers 37 and the cloth beams 38, the drive mechanisms of both cloth beams 38 being arranged on opposite ends of the machine. The main shafts 63 carry each a cam not represented in the drawing for operating one arm 87 of a knee lever the other arm 88 of which supports the tension roller 34, the knee lever 87, 88 being journalled to the frame 30 of the machine at 89.

Details of the reeds 36 and the reed drive means are more particularly shown in Figs. 5 to 7. The dents of the reeds 36 are formed by peculiarly shaped laminae 90 having arms 91 and 92 integral therewith and forming a tunnel-like race 93 for guiding the shuttle 51. Laminae 90 have enlarged bottom parts 94 engaging with a groove 95 in an enlarged portion 96 of a reed shaft 97. Attachment rails 98 fix the laminae 90 by means of set screws 99 in their engaging position in such a manner that after removal of set screws 99 and attachment rails 98 laminae 90 are exchangeable each without displacing the others. Between arms 91 and 92 each laminae 90 has a notch 100 for receiving a weft thread 101 when shuttle 51 passes the tunnel-like race 93. Another notch 102 is provided for guiding the weft thread 101 during beat up motions of the reeds 36. Reference number 103 (Fig. 7) designates bearings supporting the reed shafts 97 by engaging with cylindrical portions thereof worked out at suitable intervals from the body of the enlarged portion 96.

For displacing the reeds 36 from their picking position into their beat up position illustrated by full lines and dotted lines in Fig. 5, respectively, each of the reed shafts 97 has crank arms 104 keyed to it. The free end of crank arms 104 is journalled at 105 to one end of an adjustable draw bar 106 the other end of which is journalled at 107 to a bell crank 108 swingably connected to frame 30 of the machine. The middle part of bell crank 108 supports a roller 109 which moves against the edge of a cam 110 keyed to the associated main shaft 63. Contact between cam 110 and roller 109 is assured by a pair of extension springs 111 acting by one of the spring ends on journal 105 by means of a swingable arm 112. As shown particularly in Fig. 6, the other ends of springs 111 are connected each to one arm 113 of a double-armed lever. Between the other arm 114 of the double-armed lever and the frame 30 there is a compression spring 115 urging the lever 113, 114 to rotate against spring 111 so as to abut against a movable electric contact 116 adapted to interrupt the electric circuit 117 of electric motor 62 and thereby rotation of the main shafts 63 should one of springs 111 sag or break. Instead of interrupting the electric circuit 117 the movable electric contact 116 might also be arranged so as to close an electric circuit comprising a signal lamp thereby indicating a trouble in working of springs 111. Springs 111 are selected so as to overwhelm the pressure of springs 115 and hold levers 113, 114 disengaged from contacts 116 as it is represented in the drawing.

Referring particularly to Fig. 7, rotation is imparted to the represented main shaft 63 by means of an electromagnetic clutch 118 known per se the rotary part 119 of which is fastened to pinion 75 while its stationary part 120 is keyed to main shaft 63. Furthermore, main shaft 63 is provided with an electro-magnetic brake 121 the rotary part 122 of which is keyed to main shaft 63 whereas stationary part 123 of brake 121 is fixed on frame 30 of the machine. Reference number 124 denotes an electric circuit which connects a source of direct current 125 to terminals 126, 127 and 128, 129 of the electromagnetic clutch 118 and of the electro-magnetic brake 121, respectively. The sizes of the above mentioned electro-magnetic means are selected so as to transmit e. g. 20 mkg. work at a voltage of e. g. 6–12 volts of the D. C. source 125. It is to be remarked that the crank arms 104 are, in Fig. 7, for reason of clarity with the bell crank 108 on the opposite sides of the adjustable draw bar 106, in contradistinction to Fig. 5 where they are on the same side of the latter. This is, however, without significance as to the operation of the respective parts.

The electric control means of the electric circuit, more particularly shown in Fig. 8, are arranged so as to alternately actuate the electro-magnetic means 118 and 121. To this purpose a double-pole switch 130 is provided a movable contact 131 of which is connected to the positive terminal 132 of the D. C. source 125. The stationary contacts 133 and 134 of the double-pole switch 130 are connected to terminals 126 and 128 of the electro-magnetic means 118 and 121, respectively, both other terminals 127 and 129, respectively, of which being connected to the negative terminal 135 of the D. C. source of current 125. The movable contact 131 has a pushbar 136 journalled to it which forms a toggle joint with two further pushbars 137 and 138. One of these pushbars is journalled to frame 30 of the machine while the other acts on a spring 139 resting upon frame 30 as well. Middle point 140 of the toggle joint connects the free ends of pushbars 136, 137, 138 and abuts against a lug 141 formed as a displaceable abutment and supported by an elastic arm 142 of a double-armed lever the other arm 143 of which is journalled to a rod 144 operated by warp thread feeler members well known in the art and, therefore, not illustrated in the drawings. Furthermore, the lug 141 forms a displaceable abutment also for one end of a swivel arm 145 which bears against lug 141 opposite to the joint 140. Arm 145 is, by means of a pushbar 146, jointly connected to one arm 147 of a double-armed lever journalled to frame 30 of the machine. The other arm 148 is formed as a key adapted to be pushed down by the shuttle 51. An extension spring 149 anchored at frame 30 urges, on one hand, the double-armed lever 147, 148 in the counter-clockwise direction so as to bear against an abutment 150 and, on the other hand, the swivel arm 145 to bear against an abutment 151, both abutments 150 and 151 being fastened to frame 30 of the machine. Key 148 is arranged so as to be pushed down by the shuttle 51 only after it has left the race 93 in reed 36. Opposite to lug 141 swivel arm 145 has a guide bar 152 jointly connected to it one guide block of which is denoted by reference number 153. The free end of guide bar 152 bears against a displaceable abutment 154 forming one arm of a double-armed lever the other arm 155 of which is formed as a feeler member for contacting with the weft thread 101. Thus, pushbar 146, swivel arm 145 and guide bar 152 form a lever system which cooperates, on one hand, with the double-armed lever 147, 148 and, on the other hand, by means of the displaceable abutments 141 and 154 with the toggle joint 136, 137, 138 and thereby with the movable contact 131, and the thread feeler members, respectively, as described above. Obviously, instead of guide bar 152 a rotary shaft might be applied as well one end of which would carry a pinion camming with a toothed edge of lever arm 154 whereas its other end would support a displaceable abutment adapted to engage with swivel arm 145. By such an arrangement the moment of inertia of part 152 may substantially be reduced if necessary. The double-armed lever 154, 155 is journalled to a bifurcated arm 156 which is, in turn, fastened to reed shaft 97. Reference number 157 denotes a journal which carries, on one hand, the double-armed lever 154, 155, and, on the other hand, a further bifurcated double-armed lever arms 158 of which are connected by a bridge 159 and adapted to rotate the double-armed lever 154, 155 in the clockwise sense whereas its other arm 160 is urged by a spring 161, anchored at 162 to arm 156, into one of two extreme positions. In its initial setting, shown in Fig. 8, arm 160 is urged by spring 161 in the counter-clockwise direction so as to bear with its end against a lever arm 163. In the other extreme position arm 160 is urged by spring 161 in the clockwise sense so as to cause the bifurcated lever arm 158 to snap with its wings 164 against the bifurcated arm 156 thereby holding down a weft thread 101 which might have come by means of shuttle 51 along a series of notches 102 of reed laminae 90 and now lies in similar notches 102' of bifurcated arm 156. A brake plate 165 fastened to one branch of the bifurcated arm 156 and adapted to contact with the end of feeler organ 155 prevents a recoiling of the latter when it abuts against the weft thread 101. Arm 163 is fixed on a shaft 166 one bearing of which is denoted by reference number 167 and is fastened to frame 30 of the machine. Opposite to arm 163 shaft 166 carries a double-armed lever one arm 168 of which is urged by an extension spring 169 against an abutment 170. The other arm 171 of the double-armed lever is formed as an abutment for one arm 172 of a further double-armed lever the other arm 173 of which is shaped as a key similar to key 148 and adapted to be pushed down by the shuttle 51 as well. Double-armed lever 172, 173 is urged by another extension spring 174 to rotate in the counter-clockwise direction so as to bear with its arm 173 against an abutment 175. As indicated in the drawings abutments 170 and 175 are fastened to frame 30 and extension springs 169 and 174 are anchored at frame 30 of the machine to which the double-armed lever 172, 173 is journalled as well. Frame 30 has a further double-armed lever journalled to it, one arm 176 of which is urged by an extension spring 177 to turn in the clockwise sense so as to bear against an abutment 178. The other arm 179 of this double-armed lever is provided with a shoulder 180 adapted to engage with the end portion of feeler organ 155 when the latter is turned with the reed shaft 97 in the counter-clockwise direction as it will hereinafter be described. Both the abutment 178 and the extension spring 177 are fixed on to frame 30 of the machine.

Referring once more to the double-pole switch 130 the movable contact 131 thereof has one end of a pushbar 181 fastened to it, slide bearings of which are designated by reference number 182. The free front surface 183 of pushbar 181 co-operates with a likewisely free front surface 184 of another pushbar 185 having slide bearings 186. The other end of pushbar 185 is slidably guided in one arm 187 of a double-armed lever which is journalled at 188 to frame 30 of the machine and urged by an extension spring 189 in the clockwise sense, spring 189 being anchored at frame 30 of the machine as well. The proportions of the pushbars 181 and 185 are selected so as to leave a gap 190 between front surfaces 183 and 184, gap 190 being greater than the distance 191 between the associated contacts 131, and 133 and 134, respectively. The other arm 192 of the last-mentioned double-armed lever engages with a slide bar 193 the upper end of which supports a cam roller 194 moving against the edge of a cam 195 keyed to main shaft 63. Guide means of slide bar 193 are denoted by reference number 196. Cam 195 has such a shape that the longitudinal displacement of pushbar 185 suffices for pushing the movable contact 131 over its middle position in which pushbars 137 and 138 are aligned so that spring 139 causes movable contact 131 to snap over into its alternate position represented by full lines in Fig. 7 thereby restoring the initial position of double-pole switch 130. Moreover, cam 195 is keyed to main shaft 63 at such an angle that restoration of double-pole switch 130 takes place only after reed 36 has regained its initial position wherein race 93 is aligned with the shuttle path.

At the inlet end of race 93 main shaft 63 carries a cam 197 co-operating with one arm 198 of a crank lever journalled at 199 to frame 30 of the machine. The other arm 200 of the crank lever is, by means of a rod 201, jointly connected to an actuating arm 202 of a cam 203 journalled at 204 to frame 30 of the machine as well. Cam 203 bears against the edge of a roller 205 supported by a swingable flank 206 of the inlet tube 52 for guiding the shuttle 51 before it enters race 93 in reed 36. Flank 206 is urged in the clockwise sense by an extension spring 207 so as to turn around a pin 208 and abut against a stop 209 which with a lid 210 of the inlet tube 52, spring 207 being anchored to a frame 30 of the machine. Cam 197 has such a shape and is keyed to main shaft 63 at such an angle that flank 206 is pushed by means of cam 203 and roller 205 against spring 207 in the counterclockwise sense and thereby narrows the passage way 211 of shuttle 51 in the inlet tube 52 during the whole period of reed motion so that a shuttle 51 arriving during this period in the inlet tube 52 will be arrested therein.

A similar arrangement of operating means 118 to 211 is provided for the twin system, rotation being imparted to the twin main shaft 63 by means of pinion 70 (Figs. 2 and 7) camming with pinion 71 (Fig. 2) which is, similarly to pinion 75, attached to the rotary part 119 of the twin electro-magnetic clutch 118. However, the electric circuit 117 is mutual for both systems since their drive means 62 to 69 are common as is obvious from the drawing. The free terminals of the electric circuit 117 indicates the connection of the circuit 117 of the twin system.

Figure 10:
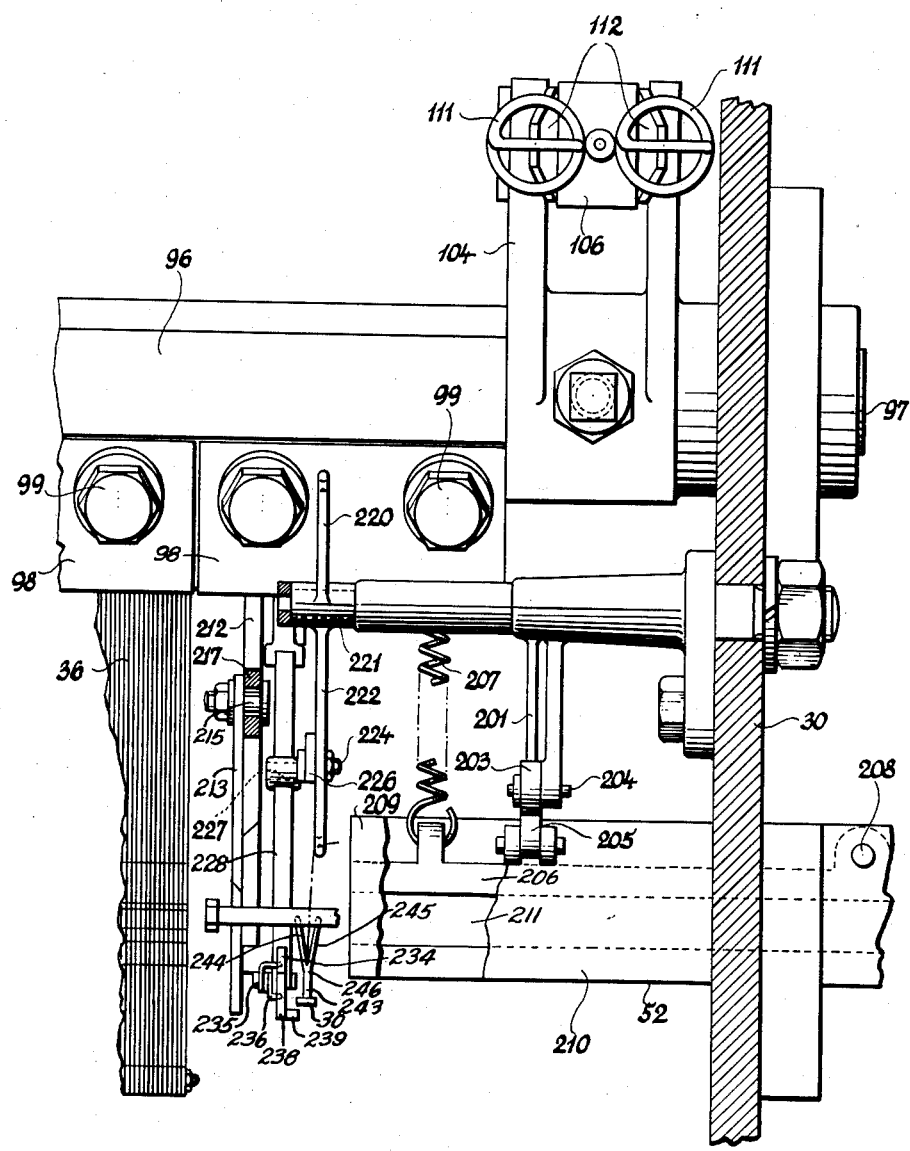
Fig. 10 is a top view of the mechanism shown in Fig. 9.

Referring particularly to Figs. 9 and 10, the enlarged body 96 of reed shaft 97 and the attachment rail 98 enclose a bottom portion of a stationary branch 212 of a pair of scissors the other branch of which is designated by reference number 213. Branch 213 is formed as one arm of a crank lever the other arm 214 of which is, by means of a pin 215, guided in a slide 216 of a guide body 217 fixed to frame 30 of the machine, the joint of the pair of scissors being formed by a pin 218. The upper end of guide body 217 has one end of an extension spring 219 anchored to it, the other end of which is connected to one arm 220 of a double-armed lever journalled to frame 30 of the machine at 221. The other arm 222 of this double-armed lever is formed as a thread guide having a guide hole 223. Moreover, arm 222 has a guide pin 224 engaging with a slide 225 in a swivel arm 226 which is jointly connected at 227 to a further swivel arm 228 journalled at 229 to frame 30 of the machine. By means of a further joint 230 swivel arm 228 is connected to one end of a guide bar 231 the other end of which is journalled at 232 to an arm 233 fastened to the enlarged portion 96 of the reed shaft 97 by the attachment rail 98 as it is the case with laminae 90 and stationary branch 212 of the pair of scissors. The free end of swivel arm 228 is formed as a thread holder the parts of which are a swingable finger 234 journalled at 235 to arm 228, and a spring 236 urging the finger 234 so as to bear against a suitably shaped end portion 237 of arm 228. Finger 234 forms one arm of a double-armed lever the other arm 238 of which carries a pin 239 by which the finger 234 can be turned in the counterclockwise direction against spring 236 so as to release a thread from between finger 234 and end portion 237. For effecting this rotation of lever 234, 238 a spring plate 240 is provided which is fastened to frame 30 of the machine by means of a pin 241. An abutment 242 fixed to frame 30 of the machine limits the motions of the spring plate 240 in the clockwise direction. Both the proportions and the arrangement are selected so that pin 239 when lifted abuts against the right hand flank of spring plate 240 and causes finger 234 to turn in the counter-clockwise direction whereas at its descent from above the spring plate 240 it glides on the left hand flank of spring plate 240 whereby the latter is pushed in the counter-clockwise direction and attributes to urging finger 234 to turn in the clockwise direction so as to cause it to bear against the end portion 237 of swivel arm 228. For guiding the weft thread 101 into its initial position wherein it is stretched across the passage way of shuttle 51, a bifurcated thread guide is provided the stem and branches of which are denoted by reference numbers 243 and 244 as well as 245, respectively, the thread guide being fixed by means of its stem to frame 30 of the machine. The point 246 of bifurcation is selected so that in the represented position of the mechanism guide hole 223 and point 246 should determine a straight line corresponding to the picking position of the weft thread 101 in front of the race 93. Another pair of scissors with a like operating mechanism is provided at the exit of race 93 between reed 36 and lever system 154 to 164. Similar guiding and cutting mechanisms 212 to 246 are provided for the twin system.

Referring to Figs. 11 to 14, the ends of the weft thread 101 extending beyond the reed 36 at both ends thereof are held by two branches 247 and 248 of thread holders 249. Branches 247 and 248 are jointly connected by means of a pin 250. Branch 247 has an arm 251 while branch 248 is prolongated into a slide bar 252 forming the stem of the thread holder 249. Between arm 251 and bar 252 there is a compression spring not represented in the drawing urging the two branches 247 and 248 towards their closing position. Slide bar 252 is guided, on one hand, by a slide bearing 253 and, on the other hand, by slots 254 of guide plates 255 between which it is engaging with an inclined passage 256 in the middle portion of an H-shaped slide 257. Slide bearing 253 is provided with a similarly inclined passage 256 for engaging with the end portion of slide bar 252 so that the latter can take in a position indicated by dotted lines in Fig. 11. The guide plates 255 are integral with each other at their bottom portion by means of which they are secured to lid 210 of inlet tube 52. The latter has a bracket 259 fastened thereto. An adjustment screw 260 situated on the upper end of bracket 259 is provided for abutting against arm 251 and thereby turning it against the above mentioned compression spring in the counterclockwise direction so as to open the branches 247 and 248 of the thread holder 249 when slide bar 252 is pushed in the left hand direction.

For imparting alternate longitudinal motion to slide bar 252 and thereby to thread holder 249 heddle shaft 72 has a disc 261 keyed to it. A lemniscate-like front groove 262 in disc 261 guides a roller 263 which is supported by a slide frame 264 slide bearing 265 of which is attached to frame 30 of the machine. Slide frame 264 is jointly connected by means of a drive rod 266 to a crank arm 267 of a shaft 268 supported by bearings 269 secured to frame 30 of the machine. On its end portion opposite to crank arm 267 shaft 268 carries another crank arm 270 which co-operates with slide bar 252. Particularly, the free end of crank arm 270 is formed as a fork the two branches of which are provided with slots 271 engaging with guide pins 272 of slide bar 252 so that at swivel motion of crank arm 270 slide bar 252 is pushed in alternate direction along its axis.

In order to remove thread holder 249 from the path of the pair of scissors 212, 214 and the swivel arm 228 as well as of the arm 222 (Figs. 9 and 10) at beat up motions of reed 36 slide 257 supporting the slide bar 252 between guide plates 255 is provided with a cut-out 273 engaging with one arm 274 of a crank lever journalled at 275 to frame 30 of the machine. The other arm 276 of this crank lever bears against the edge of a cam 277 which is fastened to reed shaft 97 by means of attachment rails 98 as it is the case with laminae 90 (Fig. 5) and arm 233 (Fig. 9). An extension spring 278 urges crank lever 274, 276 to rotate in the counterclockwise direction and is anchored at frame 30 of the machine. Obviously, when reed shaft 97 is rotated in the clockwise direction, crank lever 274, 276 turns against spring 278 also in the clockwise direction whereby its arm 274 lifts slide 257 between guide plates 255 so that slide bar 252 and with it thread holder 249 will be displaced into their inclined position. On the contrary, when reed shaft 97 rotates in the counterclockwise direction back into its initial position, spring 278 rotates crank lever 274, 276 also in the counterclockwise direction so that slide 257 is drawn back by arm 274 and thereby returns slide bar 252 with thread holder 249 into their initial position as well. The thread holder 249 at the other end of the machine is operated by tension wires 279 and 280 connected to crank arms 281 and 282, respectively, which are keyed to shaft 268 at the represented end of the machine and to a pivot at the other end thereof so that at the latter end of the machine drive means 261 to 268 can be dispensed with.

A like bending in apparatus 247 to 282 is provided for the twin system.

Figure 15:
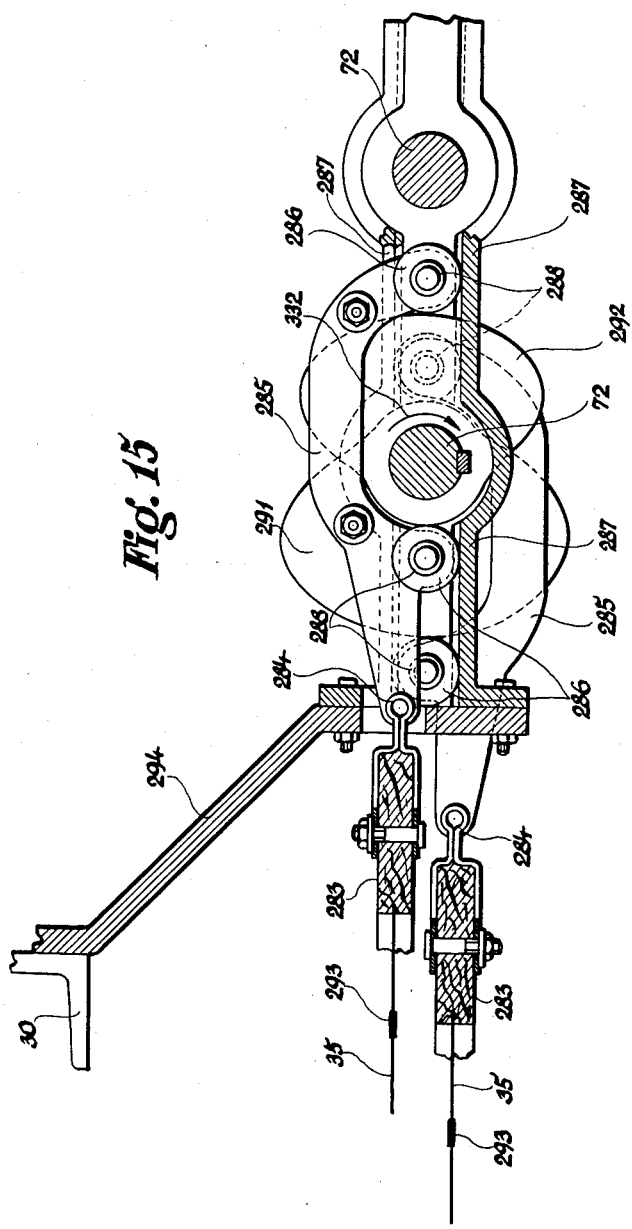
Fig. 15 is a side elevational view of a drive mechanism for operating heald frames of the loom.
Figure 17:
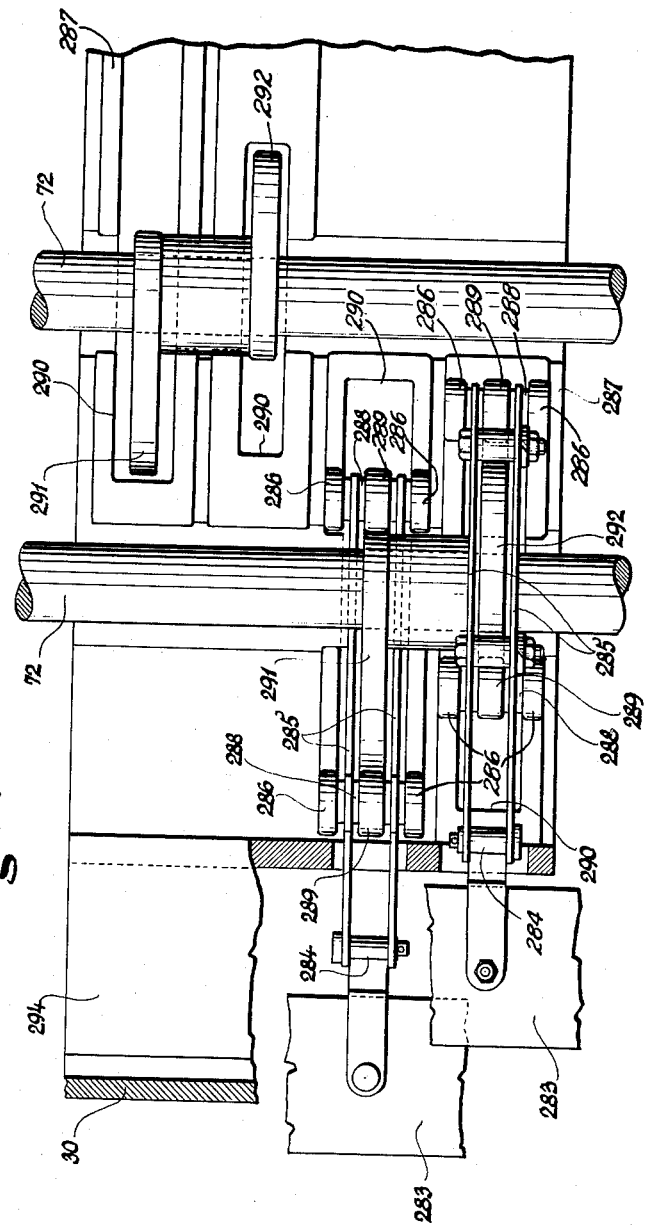
Fig. 17 is a top view of the mechanism shown in Figs. 15 and 16 partly in section along line XVII—XVII in Fig. 16.

Referring to Figs. 15 to 17, reference number 283 designates heald frames holding the heddles 35 in any suitable manner well known in the art. Each of the heald frames 283 is jointly connected at 284 to a carriage. This comprises a two-part bridle 285 bridging the associated heddle shaft 72. By means of rollers 286, pairwisely provided at the ends of bridles 285 and adapted to roll between two longitudinal guide plates 287, both bridles 285 are shiftably arranged so as to perform alternate longitudinal motions. Each pair of rollers 286 has a mutual shaft 288 which carries a further roller 289 between the two parts of each bridle 285. Rollers 286 and 289 are of the same size. Above and below the path of rollers 289 guide plates 287 have cut-outs 290 in each of which the rollers 289 move against the edge of cams 291 and 292, respectively. Cams 291 and 292 are keyed to heddle shaft 72 and have such a shape that the distance of any diametrical points of the cam surface is equal to the distance between the cylindrical surfaces of two opposite rollers 289 associated with one and the same cam 291 and 292, respectively. Thus at rotation of heddle shaft 72 the motions of carriages 285, 288, 289 and thereby the movements of the heald frames 283 are positively controlled in the sense of alternate longitudinal displacement of the heddles 35. Cam 291 has a greater size and thereby a greater excentricity than cam 292 so that the associated heald frames 283 undergo different longitudinal displacements and in consequence hereof assure equal tension of the warp threads when forming the shed. The proportions are selected so that in case of heddles 35 having heald eyes 293 of a height of 2 millimetres the two groups of heddles 35 produce double sheds of a height of 36 and 46 millimetres, respectively. As it is obvious from the drawing, guide plates 287 are, by means of an intermediate girder 294, attached to frame 30 of the machine.

A symmetrical part of the above described mechanism, partly shown in Figs. 15 and 17 and comprising another series of constructional parts 283 to 294, serves for operating the heddles of the twin system.

Referring to Figs. 18 to 20 the gripping shuttle 51 is provided with a transverse slot 295 at its front for guiding a weft thread, and with a longitudinal bottom groove 296 having a recess 297 which partly intersects with slot 295 at the bottom section of the latter. At the intersecting portions of slot 295 and groove 296 there is a thread gripper 298 forming one arm of a double-armed lever accommodated in recess 297 and journalled to the body of shuttle 51 at 299. The other arm 300 of this double-armed lever has its end slotted. The slotted end of arm 300 engages with one end of a spring 301 the other end of which is embedded in the bottom of recess 297. Obviously, spring 301 urges double-armed lever 298, 300 to rotate in the clockwise direction so as to cause thread gripper 296 to bear against the top wall of slot 295. Lever arm 300 is adapted to co-operate with a stationary joint tongue 302 situated within the outlet tubes 53 arranged at the exits of races 93 as it is more particularly shown in Figs. 2 and 7.

Each of the inlet passages 55 (Fig. 3) has its bottom sloping towards the tunnel 50 and is provided with a lid not represented in the drawing. The lid has an inlet the shape of which is fitting to the contour of the shuttle 51 as it is shown in Fig. 18. Thus it is impossible to put in the shuttle 51 in a wrong position. Furthermore, inlet passage 55 joints the main path of shuttle 51 by way of a switch likewisely not represented in the drawing. This switch is adjustable by a button so that either inlet passages 55 or races 93 are joined to the tunnels 50. In the direction of forward motion of the shuttle 51 the switch is yieldingly arranged so that in this direction shuttle 51 can pass the switch independently from the adjustment thereof.

Reference number 303 designates a mantle of the machine (Fig. 2). Guard plates covering the borders of the heddles 35 are denoted by reference number 304 (Fig. 2). Reference number 305 refers to protective boards covering the systems of warp threads 32 (Fig. 1). The mechanisms guiding and cutting the weft threads (Figs. 9 and 10), and bending in the ends thereof (Figs. 11 to 14), respectively, are covered by guard lids 306 as shown in Figs. 3 and 7.

Shafts 56 of carrier wheels 41 (Figs. 1 and 3) are provided with not represented hand drive gears by which they can be rotated in either sense. Reference numbers 307 and 308 designate switchboards at both ends of the machine (Fig. 1) comprising switch-off buttons 309 adapted to interrupt the electric circuit 117 of motor 62 as well as the electric circuits 310 of motors 61 (Fig. 7), signal lamps 311 and signal windows 312 for indicating service disturbances in general and in particular, respectively. However, only switchboard 307 is provided with a switch-on button 313, since switchboard 307 is associated to the entrance of reed 36 and is situated within reach as regards the inlet passage 55 for the shuttle 51.

Similar arrangements 307 to 313 are provided for the twin system of the machine.

In operation, on pressing down one of the switch-on buttons 313 and thereby closing the electric circuits 117 and 310 of the motors 62 and 61, respectively, carrier wheels 41 rotate in the clockwise direction as indicated by arrows 314 in Fig. 3, while rotary parts 119 of the electro-magnetic clutches 118 rotate in the counter-clockwise and clockwise direction, respectively, as it is obvious from Figs. 2 and 7 wherein arrows 315 and 316 indicate the direction of rotation of intermediary shaft 68 and pinion 70, respectively, and arrows 317 and 318 that of rotary parts 119, respectively. The electric circuits 124 of the electro-magnetic means being closed through the electro-magnetic brakes 121 main shafts 63 proper stand still so that neither reed shafts 97 nor heddle shafts 72 are momentarily set into motion. Thus reeds 36 and heddles 35 occupy their basic or initial position.

The gripping shuttle 51 will in a predetermined position be put into the above described inlet in the lid of one of the inlet passages 55 as indicated by dotted lines in Fig. 3. With regard to the sloping bottom of the inlet passages 55 shuttle 51 occupies an inclined position wherefrom it can be caused by a forward push to glide down into the tunnel 50. Here the shuttle 51 comes in engagement with the outer and inner belts 45 and 46 which carry it into the first curved section of its path. Moving along a curved path, the shuttle 51 is pressed by the action of centrifugal force against the outer belt 45 shuttle 51 takes up the motion thereof and leaves the tunnel 50 with a speed high enough to enable it to be shot across the shed 334 in the direction indicated by arrows 319 in Figs. 3 and 7. Thereby shuttle 51 passes through inlet tube 52 on the respective end of the machine without being arrested therein since the associated reed 36 is dwelling in its initial position offering a race 93 aligned with both the inlet tube 52 and the outlet tube 53 so that the swingable flank 206 of inlet tube 52 takes in its outermost position wherein passage way 211 is of normal width (Fig. 7).

Between inlet tube 52 and race 93 in reed 36 shuttle 51 passes through the guiding and cutting mechanism illustrated in Figs. 9 and 10, and through the bending in mechanism represented in Figs. 11 to 14. The former being threaded as shown in Fig. 9 the weft thread 101 coming in direction of arrow 337 from a feed cop not represented in the drawing becomes engaged with slot 295 of shuttle 51 and seized by thread gripper 298 so that the end of the weft thread 101 will be pulled out from between finger 234 and end portion 237 of swivel arm 228, and carried off by shuttle 51. Thus shuttle 51 takes the weft thread 101 along race 93. During its travel through race 93 weft thread 101 takes place in notch 100 of laminae 90 wherefrom it glides down into notch 102 thereof (Fig. 5).

At the exit of race 93 shuttle 51 passes the symmetrical part of the cutting and bending in mechanism as described above with reference to Figs. 8 and 11 to 14, respectively, whereafter it passes through the outlet tube 53 and pushes down keys 173 and 148 against springs 174 and 149, respectively (Figs. 7 and 8).

In the outlet tube 53 joint tongue 302 engages with groove 296 of shuttle 51 and causes thread gripper 298 to rotate in the counter-clockwise direction against spring 301 (Figs. 18 to 20) whereby the end of weft thread 101 becomes released.

By pressing down key 173 as indicated by arrow 320 (Fig. 8) arm 172 rotates in the clockwise direction as indicated by arrow 321 and turns, by means of double-armed lever 168, 171, shaft 166 against spring 169 in the counter-clockwise direction as indicated by arrows 322. Shaft 166, in turn, rotates lever arm 163 in the same direction of rotation 322 whereby double-armed lever 158, 160 and, by means of bridge 159, also double-armed lever 154, 155 are rotated against spring 161 in the clockwise sense as indicated by arrows 323. Arm 160 snaps over into its other extreme position wherein lever arms 158 rest upon arm 156. Obviously, if a weft thread 101 has been brought along by shuttle 51, the former will be caught by the wings 164 of arms 158 in the notches 102′ of bifurcated arm 156. In this case feeler organ 155 will be held up in its clockwise rotation its recoiling from weft thread 101 being prevented by brake plate 165. Thus abutment 154, though rotating in the clockwise direction as indicated by arrow 323, remains in contact with the end of guide bar 152 and prevents longitudinal shifting thereof. However, if there is no weft thread lying across bifurcated arm 156, feeler member 155 rotates so as to displace abutment 154 from the path of guide bar 152.

At pressing down key 148 as indicated by arrow 314 (Figs. 7 and 8) arm 147 rotates against spring 149 in the clockwise direction as indicated by arrow 325 and causes pushbar 146 to shift in the left hand direction as indicated by arrow 326. If abutment 154 is displaced from the path of guide bar 152, that is no weft thread 101 has been brought along by shuttle 51, swivel arm 145 will thereby rotate in the counter-clockwise direction so that no switching of the double-pole switch 130 takes place. Obviously, if lug 141 is removed by rod 144 from between swivel arm 145 and toggle joint 136 to 140, which is the case at breakage of at least one of the warp threads 32, no commutation of double-pole switch 130 takes place, though swivel arm 145 then rotates in the clockwise direction. However, if abutment 154 prevents guide bar 152 being pushed by swivel arm 145, that is if feeler member 155 rests upon a weft thread 101, and lug 141 is situated as represented in the drawing, swivel arm 145 rotates in the clockwise direction and causes, by means of lug 141 and toggle joint 136 to 140, double-pole switch 130 to snap over into its other position represented by dotted lines in Fig. 7, wherein electric circuit 124 is closed through terminals 126 and 127 of the electro-magnetic clutch 118 while the electro-magnetic brake 121 is released. Thus the associated main shaft 63 starts rotating in the direction of arrow 317 and sets into motion reed shaft 97 and heddle shaft 72 by means of cam 110 and pinion 76, respectively.

Cam 110 causes, by means of roller 109, bell crank 108 to rotate against springs 111 in the counter-clockwise direction as indicated by arrow 327 so that draw bar 106 rotates crank arm 104 in the clockwise direction as indicated by arrow 328 (as regards Fig. 5, this rotation takes place, for reasons stated above, in the counter-clockwise direction) and thereby causes reed 36 to perform its beat up motion. In Fig. 2 reed 36 of the left hand system is represented in its initial position wherein the shed is open while the right hand system is illustrated in the beat up position of the associated reed 36 with the respective shed closed.

Simultaneously with the reed motion at the entrance of reed 36 (Figs. 9 and 10) stationary branch 212 of the pair of scissors and, by means of guide bar 231, the whole system of guiding and cutting mechanism will be turned in the clockwise direction as reed shaft 97 rotates in sense of arrow 328. Arm 214 being guided in the stationary body 217, movable branch 213 of the pair of scissors comes thereby always closer to stationary branch 212. Arm 220 is rotated by means of swivel arm 226 against spring 219 in the clockwise direction guiding the weft thread 101 towards the beat up point designated by reference number 329. Meanwhile, between the reed 36 and the pair of scissors 212, 213 the weft thread 101 engages with the thread holder 249 while between the pair of scissors 212, 213 and the guide hole 223 it is caught by finger 234 after this has left spring plate 240 and could snap back into its initial position. After weft thread 101 has been stretched between thread holder 249 and finger 234, the pair of scissors 212, 213 cuts it therebetween leaving the loose ends of the thread 101 caught by thread holder 249 and finger 234, respectively. Thereafter the reed 36 soon reaches its beat up position both the initial and the beat up positions of reed 36 being indicated by dotted lines in Fig. 9. Guide 217 renders it possible to lift double-armed lever 220, 222 even during the circulation of shuttle 51 and to thread guide hole 223 without stopping the machine which may be useful at breakage of the weft thread 101. Obviously, the operation of the twin system is not disturbed thereby.

At the exit of race 93 bifurcated arm 156 rotates with reed shaft 97 in sense of arrow 328 which means, as regards Fig. 8, the counter-clockwise direction. The lever system 154 to 164 lifts the end of the weft thread 101 gripped between wings 164 and arm 156 so as to force it between branches 247 and 248 of the thread holder 249 associated with the exit of the race 93 whereupon weft thread 101 is cut between reed 36 and lever system 154 to 164 by the above mentioned pair of scissors. Thereafter feeler member 155 pushes double-armed lever 176, 179 against spring 177 in the counter-clockwise direction as indicated by arrow 330 and, in beat up position of reed shaft 97, takes in a position above shoulder 180 of arm 179.

Figure 12:
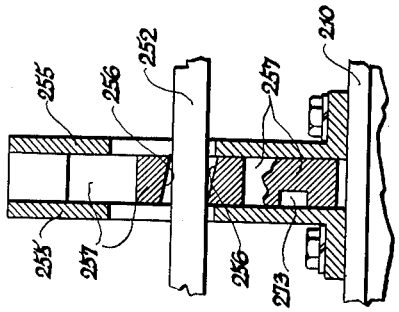
Fig. 12 is a detail of Fig. 11 on a larger scale.

Meanwhile cams 277 attached to reed shaft 97 (Figs. 11 to 14) and rotating therewith in the clockwise direction at both ends of the machine have caused crank levers 274, 276 to rotate against springs 278 also in the clockwise direction as indicated by arrow 331 whereby slides 257 are lifted between guide plates 255 thereby bringing slide bars 252 into their inclined position, indicated by dotted lines in Fig. 12, so that thread holders 249 become displaced from the path of the guiding and cutting mechanism (Figs. 9 and 10) and of the mechanism 154 to 164 (Fig. 8) with the other pair of scissors, respectively, during the beat-up motion thereof.

After the picked-in weft thread 101 has been beaten up and reed shaft 97 begins with its return motion under the action of springs 111 (Figs. 5 to 7), springs 278 (Figs. 11 to 14) cause crank levers 274, 276 to follow the motion of cams 277 in the counter-clockwise direction so as to re-establish the horizontal position of slide bars 252 and thereby the normal position of thread holders 249 wherein the thread holders 249 are situated at a level below of the beat up point 329 (Fig. 9).

As referred to above, the associated heddle shaft 72 has rotation imparted to it by means of pinions 76 and 77 in direction of arrow 332 (Figs. 2 and 7).

Figure 11:
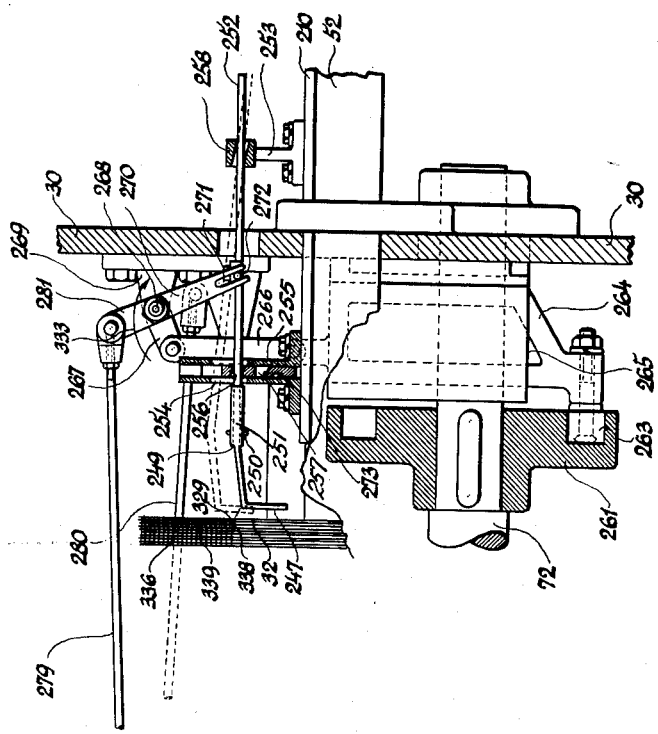
Fig. 11 is a front elevational view of a mechanism bending in the ends of the weft thread.
Figure 14:
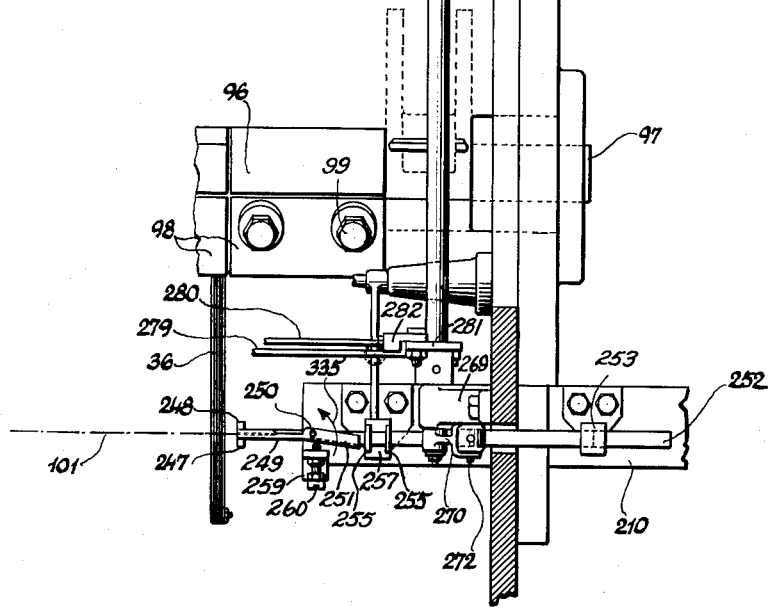
Fig. 14 is a top view of the mechanism shown in Figs. 11 to 13.
Figure 13:
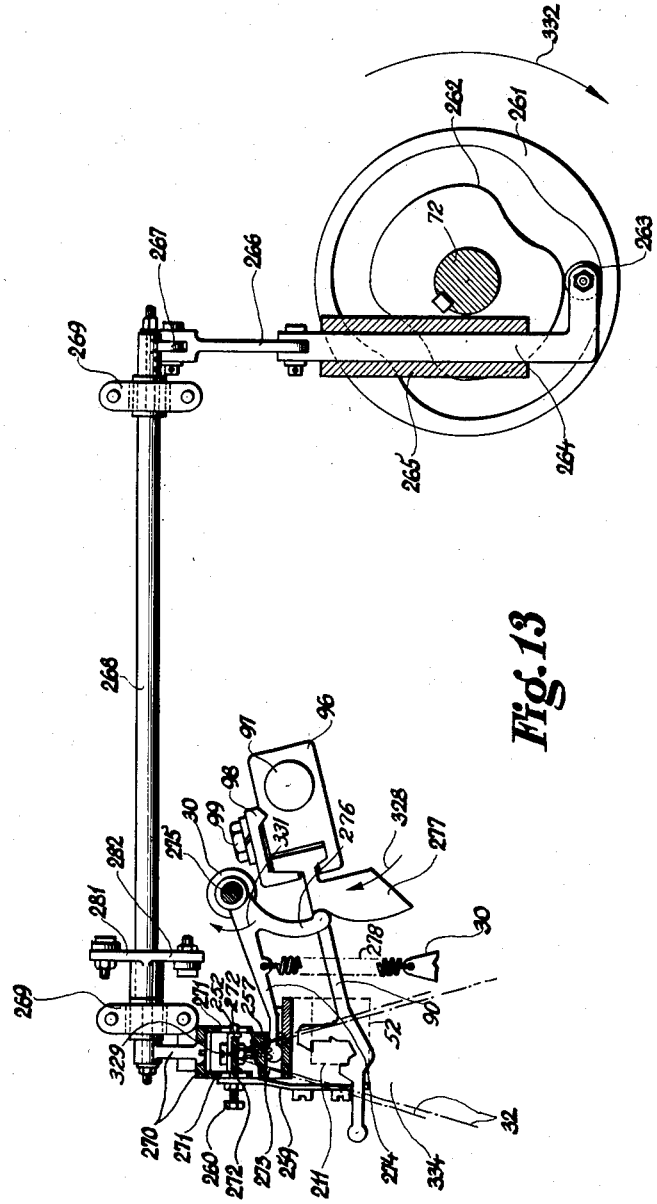
Fig. 13 is a side elevational view of the mechanism shown in Fig. 11.

Heddle shaft 72 operates, on one hand, the bending-in mechanisms (Figs. 11 to 14). After thread holders 249 have regained their normal position below the level of beat-up point 329, roller 263 enters the middle section of the lemniscate-like groove 262 whereby slide frame 264 is pushed upwards and rotates, by means of drive rod 266, shaft 268 in the clockwise direction as indicated by arrow 333 in Fig. 11. Slide bar 252 is thereby pushed inwardly so that thread holder 249 penetrates into the shed 334 formed by the warp threads 32 and bends in the loose end of the picked-in weft thread 101. In course of its inward motion arm 251 of thread holder branch 249 abuts against the adjustment screw 260 whereby it is rotated against the not represented spring therebelow in the counter-clockwise direction as indicated by arrow 335 in Fig. 14. In consequence hereof both branches 247 and 248 of thread holder 249 remove from each other so that the loose end 338 of the picked-in weft thread becomes released and lies in the shed 334 parallel to the weft threads of the fabric 336 (Figs. 1, 5 and 11). At the same time shaft 268 operates, by means of crank arm 282 and tension wire 280, the associated thread holder 249 in a like manner. Thread holders 249 continue their inward motion as long as roller 263 reaches the deepest point of its path in groove 262 whereupon slide frame 264 begins its downward motion thereby imparting an inverse rotation to shaft 268. Thus crank arm 270 and, by means of tension wire 279, crank arm 281 cause thread holders 249 to perform outward motions whereby they leave the shed 334. Obviously, at the next beat-up motion of reed 36 both ends of the previously beaten up weft thread are firmly beaten up together with the next weft thread to produce a reinforced and double selvedge 339 of the fabric 336.

On the other hand, heddle shaft 72 operates the heald frames 283 by means of cams 291 and 292 as has been described with reference to Figs. 15 to 17. While heddle shaft 72 is rotating in the clockwise direction as indicated by arrow 332 (Fig. 15), cam 291 causes the associated heald frame 283 to shift in the right hand direction while the other heald frame 283 is shifted in the left hand direction by cam 292. Thus during half a revolution of heddle shaft 72 heald frames 283 take in their alternate positions wherein shed 334 is again open. Meanwhile heald frames 283 had momentarily been aligned with each other and thus shed 334 closed as it is necessary for beating up the picked-in weft thread.

As the reed shaft 97 continues its inverse rotation, swivel arm 228 moves towards its initial position represented in Fig. 9, and double-armed lever 220, 222 rotates under action of spring 219 in the counter-clockwise direction whereby the weft thread portion bridging the gap between guide hole 223 and thread holder 234, 237 enters the space between branches 244 and 245 of the bifurcated thread guide. Thus at the end of the inverse motion of reed shaft 97 weft thread 101 is again stretched between guide hole 223 and point of bifurcation 246 across the path of shuttle 51 and ready for being gripped by the latter at the next picking thereof.

At the other end of reed 36 lever system 154 to 164 rotates in the clockwise direction (Fig. 8) whereby the end of feeler member 155 strikes against shoulder 180 of double-armed lever 176, 179 and is prevented in further rotation. Arms 158 are also retained by bridge 159 so that wings 164 are lifted from notches 102' and release the rest of the weft thread 101 which is removed by exhausters well known in the art and, therefore, not represented in the drawing. Bifurcated arm 156 is further rotated so that spring 161 becomes stretched, and, at a certain mutual angular position of arms 160 and 156, causes arm 160 to snap over into its other extreme position as illustrated in Fig. 8 whereby the initial position of the entire mechanism is regained.

During the whole period of reed motion cam 197 (Fig. 7) rotates in the counter-clockwise direction. In the course of this rotation crank lever arm 198 comes to move against the protruding edge of cam 197 whereby crank lever 198, 200 rotates in the counter-clockwise direction as indicated by arrow 340. By means of rod 201 rotation of crank lever 198, 200 is transmitted to cam 203 in the clockwise direction as indicated by arrow 341 whereby the swingable flank 206 of inlet tube 52 is pushed inwardly in direction of arrow 142 and narrows the passageway 211 of the shuttle 51 in consequence whereof the latter becomes arrested in the inlet tube 52 should it arrive therein before reed 36 regains its initial position and race 93 is aligned with the passage way 211. After reed 36 has performed its motions to and from its beat up position, crank lever arm 198 glides down from the protruding portion of cam 197 and spring 207 restores the initial position of the safety apparatus 197 to 210 wherein shuttle 51 can pass through inlet tube 52 without being arrested therein.

Towards the end of one revolution of main shaft 63 cam 195 (Fig. 7) rotating therewith pushes slide bar 193 by means of roller 194 downwards so as to rotate double-armed lever 187, 192 against spring 189 in the counter-clockwise direction whereby pushbar 185 becomes displaced in the right hand direction as indicated by arrows 343 to 345, respectively. In consequence hereof front surface 184 of pushbar 185 strikes against front surface 183 of pushbar 181 and displaces the latter in the same direction 345 so as to cause toggle joint 136 to 140 to snap over into its alternate position represented by full lines in Figs. 7 and 8. Double-pole switch 130 becomes commutated thereby and closes electric circuit 124 through terminals 128, 129 of the electro-magnetic brake 121 at the same time interrupting the electric circuit of the electromagnetic clutch 118. Thus rotation of main shaft 63 will immediately be stopped and the entire mechanism operating heddles 35 and reed 36 on the associated side of the machine has regained its initial position wherein it is ready for being operated in the above described manner as shuttle 51 crosses the associated race 93 next time.

Shuttle 51 leaving outlet tube 53 (Fig. 7) enters the tunnel 50 at the other end of the machine (Fig. 3) and regains its working speed which had somewhat been diminished by friction on the laminae 90 during crossing the race 93. Passing the other curved section of its path shuttle 51 arrives in the inlet tube 52 associated with the twin system of the machine, and crosses the other reed 36 in the above described manner. Thereafter shuttle 51 enters outlet tube 53 neighbouring the inlet passage 55 wherefrom it has started its circulation and arrives in the tunnel 50 at the left hand end of the machine so as to continue its circulation through both sheds 334 on opposite sides of the machine as it already has fully been described.

In order to stop the machine one of switch-off buttons 309 (Figs. 1 and 7) has to be pressed down whereby the electric circuits 117 and 310 of motors 62 and 61, respectively, become interrupted so that neither main shafts 63 nor shafts 56 of carrier wheels 41 are rotated any more. For removing shuttle 51 from the machine the above mentioned switches at the exit of the inlet passages 55 are adjusted so as to connect the respective inlet passage 55 with the associated tunnel 50. Thereafter carrier wheels 41 are rotated by their above mentioned hand drive gears in the counter-clockwise sense (Fig. 3) whereby shuttle 51 resting in one of tunnels 50 is carried backwards and appears in the inlet of the lid of the associated inlet passage so that it is rendered accessible for being lifted by hand. If shuttle 51 has remained in one of the races 93, it can be pushed by means of a thin rod back into the tunnel previously passed wherefrom it will be removed in the above described manner.

Figure 21:
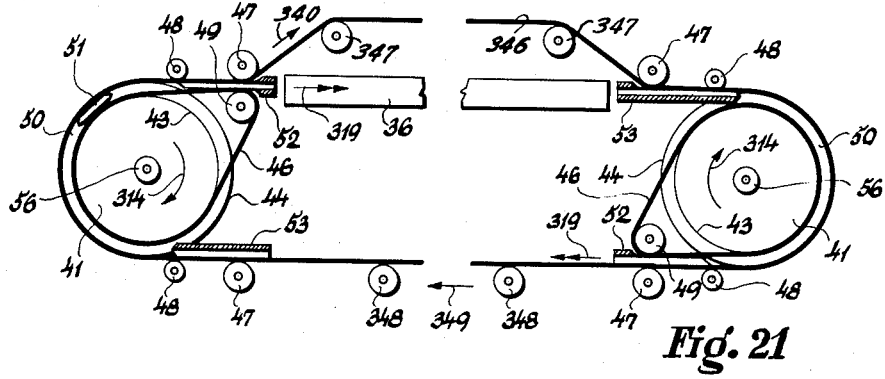
Fig. 21 is a diagrammatic front view of another embodiment of the invention.

Fig. 21 represents an embodiment of the invention wherein both outer belts 45 of the previous embodiment are united to a single outer belt 346. The machine is of the horizontal weave plane system. Above the reed 36 outer belt 346 is guided by rollers 347. Similar rollers 348 are provided for guiding outer belt 346 at the bottom of the machine. Arrows 349 indicate the direction of belt circulation.

Figure 22:
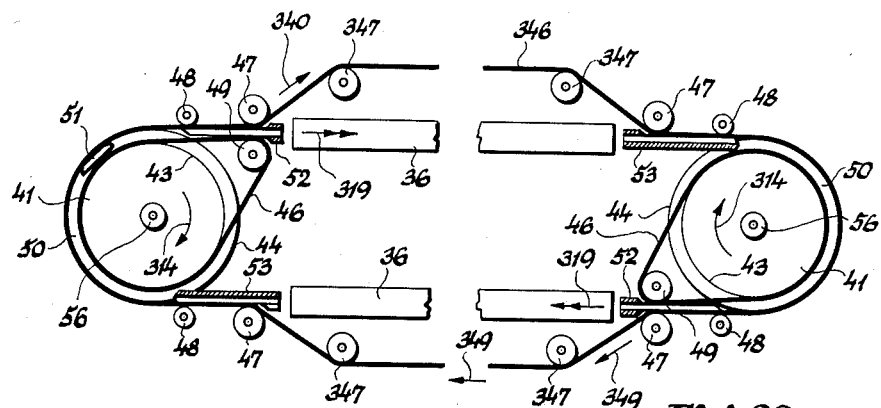
Fig. 22 is a diagrammatic top view of a further embodiment of the invention.

Fig. 22 illustrates another embodiment of the twin system type as has been described with reference to Figs. 1 to 20. Yet, instead of two outer belts 45 a single outer belt 346 is provided as it is the case with the embodiment shown in Fig. 21. The latter, however, is of the horizontal weave plane type as has been stated, whereas the former comprises two vertical weave planes.

Figure 23:
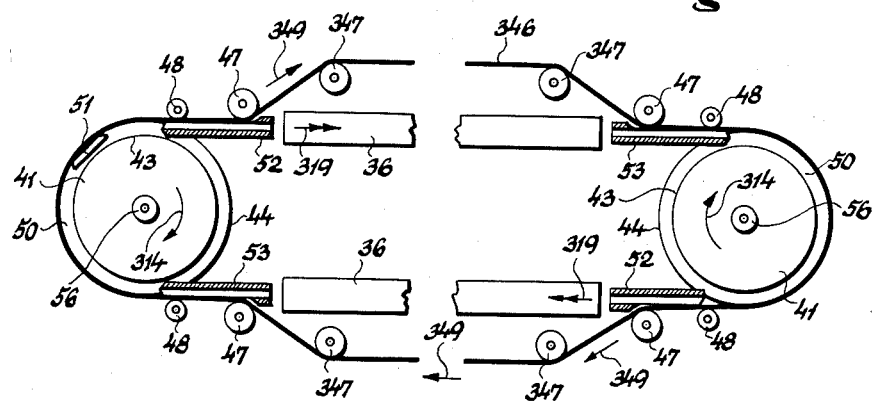
Fig. 23 is a diagrammatic top view of a still further embodiment of the invention.

Fig. 23 shows an embodiment similar to that in Fig. 22 yet with the difference that inner belts 46 of the previous embodiments are omitted. Tunnels 50 are formed by the outer belt 346 and the grooves 43 of the carrier wheels 41.

Instead of outer belts 45 or 346 other flexible circulation means, e. g. chains or crawlers, might be applied as well. Moreover, the drive means for reversing the shuttle along a path outside of the shed might also be formed e. g. by a series of driven rollers arranged along the outer side of the curved sections of the shuttle path. In this case as the shuttle is forwarded by the rotating rollers along the curved sections of its path, the centrifugal force originating thereby suffices to assure the necessary contact between shuttle and rollers even if there are no special means, e. g. friction surfaces or interlocking elements, to render the contact more efficient or to control it positively.

We claim:

1. A high capacity mechanical loom comprising shed forming means for warp threads, a gripping shuttle adapted to circulate through said shed, reeds adapted to support said shuttle while travelling through said shed, rotary means arranged at either end of said shed, flexible circulation means adapted to cooperate with the circumference of said rotary means, said rotary means and said flexible circulation means forming curved guide means for supporting said shuttle ouside of said shed and for reversing it so as to circulate with its point ahead, drive means for setting into motion said rotary means and thereby said flexible circulation means so as to further said shuttle by contact under the action of centrifugal force and thereby to impart speed to it for being shot across said shed, and independent sources of power for imparting motion to said drive means at either end of said shed.

2. A high capacity mechanical loom comprising shed forming means for warp threads, a gripping shuttle adapted to circulate through said shed, reeds adapted to support said shuttle while traveling through said shed, rotary means arranged at either end of said shed, flexible circulation means adapted to cooperate with the circumference of said rotary means, said rotary means and said flexible circulation means forming curved guide means for supporting said shuttle outside of said shed and for reversing it so as to circulate with its point ahead, and drive means for setting into motion said rotary means and thereby said flexible circulation means so as to further said shuttle by contact under the action of centrifugal force and thereby to impart speed to it for being shot across the shed.

3. A high capacity mechanical loom, comprising a gripping shuttle adapted to circulate through a shed; drive means for reversing said shuttle along a path outside of said shed; carrier wheels adapted to rotate; a groove provided in the circumference of said carrier wheels; flexible circulation means adapted to co-operate with the circumference of said carrier wheels; both the said carrier wheels and the said flexible circulation means forming parts of said drive means; said flexible circulation means and said groove enclosing a tunnel adapted to receive said shuttle; said drive means being arranged along curved sections of said path so as to further said shuttle by contact under the action of centrifugal force and thereby to impart speed to it for being shot across said shed.

4. A high capacity mechanical loom, comprising a gripping shuttle adapted to circulate through a shed; drive means for reversing said shuttle along a path outside of said shed; carrier wheels adapted to rotate; a groove provided in the circumference of said carrier wheels; flexible circulation means adapted to co-operate with the circumference of said carrier wheels; flanges provided on either side of said carrier wheels and adapted to limit tranverse motions of said flexible circulation means on the circumference of said carrier wheels; both the said carrier wheels and the said flexible circulation means forming parts of said drive means; said flexible circulation means and said groove enclosing a tunnel adapted to receive said shuttle; said drive means being arranged along curved sections of said path so as to further said shuttle by contact under the action of centrifugal force and thereby to impart speed to it for being shot across said shed.

5. A high capacity mechanical loom, comprising a gripping shuttle adapted to circulate through a shed; drive means for reversing said shuttle along a path outside of said shed; carrier wheels adapted to rotate; a groove provided in the circumference of said carrier wheels; at least one belt adapted to co-operate with the circumference of said carrier wheels; flanges provided on either side of said carrier wheels and adapted to limit transverse motions of said belt on the circumference of said carrier wheels; guide means for confining said belt to the circumference of said carrier wheels in curved sections of the shuttle path; both the said carrier wheels and the said belt forming parts of said drive means; said belt and said groove enclosing a tunnel adapted to receive said shuttle; said drive means being arranged along said curved sections so as to further said shuttle by contact under the action of centrifugal force and thereby to impart speed to it for being shot across said shed.

6. A high capacity mechanical loom, comprising a gripping shuttle adapted to circulate through a shed; drive means for reversing said shuttle along a path outside of said shed; carrier wheels adapted to rotate; a groove provided in the circumference of said carrier wheels; at least one outer belt adapted to co-operate with the circumference of said carrier wheels; flanges provided on either side of said carrier wheels and adapted to limit transverse motions of said outer belt on the circumference of said carrier wheels; guide means for confining said outer belt to the circumference of said carrier wheels in curved sections of the shuttle path; inner belts adapted to co-operate each with the bottom surface of said groove in said carrier wheels; said carrier wheels and said outer belt and said inner belts forming parts of said drive means; flanges provided on either side of said carrier wheels and adapted to limit transverse motions of said outer belt on the circumference of said carrier wheels; said outer belt and said inner belts enclosing a tunnel with the side walls of said groove, said tunnel being adapted to receive said shuttle; said drive means being arranged along said curved sections so as to further said shuttle by contact under the action of centrifugal force and thereby to impart speed to it for being shot across said shed.

7. A high capacity mechanical loom, comprising a gripping shuttle adapted to circulate through a shed; drive means for reversing said shuttle along a path outside of said shed; carrier wheels adapted to rotate; a groove provided in the circumference of said carrier wheels; outer belts adapted to co-operate with the circumference of said carrier wheels; flanges provided on either side of said carrier wheels and adapted to limit transverse motions of said outer belts on the circumference of said carrier wheels; guide means for confining said outer belts to the circumference of said carrier wheels in curved sections of the shuttle path; inner belts adapted to co-operate with the bottom surface of said groove in said carrier wheels; said carrier wheels and said outer belts and said inner belts forming parts of said drive means; flanges provided on either side of said carrier wheels and adapted to limit transverse motions of said outer belts on the circumference of said carrier wheels; said outer belts and said inner belts enclosing a tunnel with the side walls of said groove, said tunnel being adapted to receive said shuttle; said drive means being arranged along said curved sections so as to further said shuttle by contact under the action of centrifugal force and thereby to impart speed to it for being shot across said shed.

8. A high capacity mechanical loom comprising shed forming means for warp threads, a gripping shuttle adapted to circulate through said shed, reeds formed as one motional unit and adapted to support said shuttle while travelling through said shed, rotary means arranged at either end of said shed, flexible circulation means adapted to cooperate with the circumference of said rotary means, said rotary means and said flexible circulation means forming curved guide means for supporting said shuttle outside of said shed and for reversing it so as to circulate with its point ahead, drive means for setting into motion said rotary means and thereby said flexible circulation means so as to further said shuttle by contact under the action of centrifugal force and thereby to impart speed to it for being shot across said shed, reed drive means adapted to impart intermittent beat up motion to said reeds, control means for actuating said reed drive means and adapted to be operated directly by said shuttle so as to cause beat up motions of said reeds only after said shuttle has left said shed.

9. A high capacity mechanical loom comprising shed forming means for warp threads, a gripping shuttle adapted to circulate through said shed, reeds formed as one motional unit and adapted to support said shuttle while traveling through said shed, rotary means arranged at either end of said shed, flexible circulation means adapted to cooperate with the circumference of said rotary means, said rotary means and said flexible circulation means forming curved guide means for supporting said shuttle outside of said shed and for reversing it so as to circulate with its point ahead, drive means for setting into motion said rotary means and thereby said flexible circulation means so as to further said shuttle by contact under the action of centrifugal force and thereby to impart speed to it for being shot across said shed, reed drive means adapted to impart intermittent beat up motion to said reeds, electric control means for actuating said reed drive means and adapted to be operated directly by said shuttle so as to cause beat up motions of said reeds only after said shuttle has left said shed.

10. A high capacity mechanical loom formed as a twin machine with two perpendicular weave planes, comprising two sets of shed forming means for warp threads, a single gripping shuttle adapted to circulate through both of said sheds, two reeds each associated with one of said shed forming means and adapted to support said shuttle while travelling through said sheds, rotary means arranged at either end of said shed, flexible circulation means adapted to cooperate with the circumference of said rotary means, said rotary means and said flexible circulation means forming curved guide means for supporting said shuttle outside of said sheds and for reversing it so as to circulate with its point ahead, and drive means for setting into motion said rotary means and thereby said flexible circulation means so as to further said shuttle along said curved guide means by contact under the action of centrifugal force and thereby to impart speed to it for being shot across said sheds.

11. A high capacity mechanical loom formed as a twin machine with two perpendicular weave planes, comprising two sets of shed forming means for warp threads, a single gripping shuttle adapted to circulate through both of said sheds, two reeds each associated with one of said shed forming means and adapted to support said shuttle while travelling through said sheds, rotary means arranged at either end of said shed, flexible circulation means adapted to cooperate with the circumference of said rotary means, said rotary means and said flexible circulation means forming curved guide means for supporting said shuttle outside of said sheds and for reversing it so as to circulate with its point ahead, two sets of reed drive means adapted to impart intermittent beat up motion to each of said reeds independently from each other, two sets of control means each associated with one of said reeds and adapted to actuate one of said reed drive means, said control means being adapted to be operated directly by said shuttle so as to cause beat up motions of said reeds only after said shuttle has left the shed associated therewith, drive means for setting into motion said rotary means and thereby said flexible circulation means so as to further said shuttle by contact under the action of centrifugal force and thereby to impart speed to it for being shot across said sheds.

12. A high capacity mechanical loom, comprising a gripping shuttle adapted to circulate through a shed; drive means for reversing said shuttle along a path outside of said shed, said drive means being arranged along curved sections of said path so as to further said shuttle by contact under the action of centrifugal force and thereby to impart speed to it for being shot across said shed; a reed; a source of power; a shaft adapted to impart intermittent beat up motion to said reed; a stationary structure supporting said shaft; electromagnetic clutch means inserted between said source of power and said shaft; electro-magnetic brake means inserted between said shaft and said stationary structure; electric control means for alternately actuating said electro-magnetic means and adapted to be operated directly by said shuttle so as to cause beat up motions of said reed only after said shuttle has left said shed.

13. A high capacity mechanical loom, comprising a gripping shuttle adapted to circulate through a shed; drive means for reversing said shuttle along a path outside of said shed, said drive means being arranged along curved sections of said path so as to further said shuttle by contact under the action of centrifugal force and thereby to impart speed to it for being shot across said shed; a reed; a source of power; a shaft adapted to impart intermittent beat up motion to said reed; a stationary structure supporting said shaft; electro-magnetic clutch means inserted between said source of power and said shaft; electro-magnetic brake means inserted between said shaft and said stationary structure; a source of current; a double-pole switch inserted between said source of current and said electro-magnetic means for alternately actuating said clutch means and said brake means and adapted to be commutated by said shuttle so as to cause beat up motions of said reed only after said shuttle has left said shed; and control means adapted to be actuated by said shaft for re-adjusting said double-pole switch after it has been commutated by said shuttle.

14. A high capacity mechanical loom, comprising a gripping shuttle adapted to circulate through a shed; drive means for reversing said shuttle along a path outside of said shed, said drive means being arranged along curved sections of said path so as to further said shuttle by contact under the action of centrifugal force and thereby to impart speed to it for being shot across said shed; a reed; a shaft adapted to impart intermittent beat up motion to said reed; a stationary structure supporting said shaft; a source of power; electro-magnetic clutch means inserted between said source of power and said shaft; electro-magnetic brake means inserted between said shaft and said stationary structure; a source of current; a double-pole switch inserted between said source of current and said electro-magnetic means for alternately actuating said clutch means and said brake means and adapted to be commutated by said shuttle so as to cause beat up motions of said reed only after said shuttle has left said shed; feeler means for contacting with a thread and adapted to permit commutation of said double-pole switch only if said shuttle has brought a weft thread through said shed; and control means adapted to be actuated by said shaft for re-adjusting said double-pole switch after it has been commutated by said shuttle.

15. A high capacity mechanical loom, comprising a gripping shuttle adapted to circulate through a shed; drive means for reversing said shuttle along a path outside of said shed, said drive means being arranged along curved sections of said path so as to further said shuttle by contact under the action of centrifugal force and thereby to impart speed to it for being shot across said shed; a reed; a shaft adapted to impart intermittent beat up motion to said reed; a stationary structure supporting said shaft; a source of power; electro-magnetic clutch means inserted between said source of power and said shaft; electro-magnetic brake means inserted between said shaft and said stationary structure; a source of current; a double-pole switch inserted between said source of current and said electro-magnetic means for alternately actuating said clutch means and said brake means; a double-armed lever for commutating said double-pole switch; spring means for urging said double-armed lever out of its commutating position; one arm of said double-armed lever being adapted to be pushed by said shuttle against said spring means after said shuttle has left said shed; a lever system journalled to the other arm of said double-armed lever for displacing the movable contact of said double-pole switch; displaceable abutments adapted to engage with said lever system and thereby to cause pivoting thereof so as to displace said movable contact when said double-armed lever is pivoted by said shuttle; thread-feeler means adapted to disengage said abutments from said lever system if they do not contact with threads thereby preventing displacement of said movable contact and beat up motions of said reed; and control means adapted to be actuated by said shaft for re-adjusting said double-pole switch after it has been commutated by said double-armed lever.

16. A high capacity mechanical loom, comprising a gripping shuttle adapted to circulate through a shed; drive means for reversing said shuttle along a path outside of said shed, said drive means being arranged along curved sections of said path so as to further said shuttle by contact under the action of centrifugal force and thereby to impart speed to it for being shot across said shed; a source of power for operating said drive means; a reed; drive means adapted to impart intermittent beat up motion to said reed; a source of power for operating said second mentioned drive means; said first mentioned source of power being independent from said second mentioned source of power; and control means for actuating said second mentioned drive means and adapted to be operated by said shuttle so as to cause beat up motions of said reed only after said shuttle has left said shed.

17. A high capacity mechanical loom, comprising a gripping shuttle adapted to circulate through a shed; drive means for reversing said shuttle along a path outside of said shed, said drive means being arranged along curved sections of said path so as to further said shuttle by contact under the action of centrifugal force and thereby to impart speed to it for being shot across said shed; a reed consisting of laminae; arms integral with said laminae and forming a tunnel-like race for guiding said shuttle; a shaft supporting said laminae; drive means adapted to impart intermittent beat up motion to said shaft; spring means urging said shaft out of its beat up position; and control means for actuating said second mentioned drive means and adapted to be operated by said shuttle so as to cause beat up motions of said shaft against said spring means only after said shuttle has left said shed.

18. A high capacity mechanical loom, comprising a gripping shuttle adapted to circulate through a shed; drive means for reversing said shuttle along a path outside of said shed, said drive means being arranged along curved sections of said path so as to further said shuttle by contact under the action of centrifugal force and thereby to impart speed to it for being shot across said shed; a reed consisting of laminae; arms integral with said laminae and forming a tunnel-like race for guiding said shuttle; a shaft; grooved means keyed to said shaft and adapted to receive enlarged bottom parts of said laminae; attachment rails for fixing said laminae to said shaft by engaging said bottom parts with said grooved means so as to render said laminae exchangeable each without displacing the others; drive means adapted to impart intermittent beat up motion to said shaft; spring means urging said shaft out of its beat up position; and control means for actuating said second-mentioned drive means and adapted to be operated by said shuttle so as to cause beat up motions of said shaft against said spring means only after said shuttle has left said shed.

19. A high capacity mechanical loom comprising shed forming means for warp threads, a gripping shuttle adapted to circulate through said shed, reeds adapted to support said shuttle while travelling through said shed, rotary means arranged at either end of said shed, flexible circulation means adapted to cooperate with the circumference of said rotary means, said rotary means and said flexible circulation means forming curved guide means for supporting said shuttle outside of said shed and for reversing it so as to circulate it with its point ahead, drive means for setting into motion said rotary means and thereby said flexible circulation means so as to further said shuttle by contact under the action of centrifugal force and thereby to impart speed to it for being shot across the shed, laminae forming said reeds, arms integral with said laminae and forming a tunnel-like race for guiding said shuttle, said arms enclosing a notch for receiving a weft thread when said shuttle passes said tunnel-like race, a shaft supporting said laminae, drive means adapted to impart intermittent beat up motion to said shaft, spring means urging said shaft out of its beat up position, and control means for actuating said second-mentioned drive means and adapted to be operated by said shuttle so as to cause beat up motions of said shaft against said spring means only after said shuttle has left said shed.

20. A high capacity mechanical loom, comprising a gripping shuttle adapted to circulate through a shed; drive means for reversing said shuttle along a path outside of said shed, said drive means being arranged along curved sections of said path so as to further said shuttle by contact under the action of centrifugal force and thereby to impart speed to it for being shot across said shed; a reed; drive means adapted to impart intermittent beat up motion to said reed; control means for actuating said second-mentioned drive means and adapted to be operated by said shuttle so as to cause beat up motions of said reed only after said shuttle has left said shed; heddles; and positive control means for actuating said heddles and adapted to be operated by said second-mentioned drive means in synchronism with the beat up motions of said reed.

21. A high capacity mechanical loom, comprising a gripping shuttle adapted to circulate through a shed; drive means for reversing said shuttle along a path outside of said shed, said drive means being arranged along curved sections of said path so as to further said shuttle by contact under the action of centrifugal force and thereby to impart speed to it for being shot across said shed; a reed; drive means adapted to impart intermittent beat up motion to said reed; control means for actuating said second-mentioned drive means and adapted to be operated by said shuttle so as to permit beat up motions of said reed only after said shuttle has left said shed; heddles; movable frames supporting said heddles; a shaft adapted to be intermittently rotated by said second-mentioned drive means in synchronism with the beat up motions of said reed; a stationary structure supporting said shaft; cams keyed to said shaft; carriages connected to said frames and adapted to roll on said stationary structure; rollers supported by said carriages and adapted to move against the edge of said cams on either side of said shaft so as to impart positively controlled alternate motion to said frames.

22. A high capacity mechanical loom, comprising a gripping shuttle adapted to circulate through a shed; drive means for reversing said shuttle along a path outside of said shed, said drive means being arranged along curved sections of said path so as to further said shuttle by contact under the action of centrifugal force and thereby to impart speed to it for being shot across said shed; a reed; drive means adapted to impart intermittent beat up motion to said reed; control means for actuating said second-mentioned drive means and adapted to be operated by said shuttle so as to cause beat up motions of said reed only after said shuttle has left said shed; heddles; movable frames supporting said heddles; a shaft adapted to be intermittently rotated by said second-mentioned drive means in synchronism with the beat up motions of said reed; a stationary structure supporting said shaft; cams keyed to said shaft; carriages connected to said frames and adapted to roll on said stationary structure; rollers supported by said carriages and adapted to move against the edge of said cams on either side of said shaft so as to impart positively controlled alternate motion to said frames; the cams for operating different frames having different excentricity so as to assure equal tension of warp threads when forming said shed.

23. A high capacity mechanical loom, comprising a gripping shuttle adapted to circulate through a shed and provided with a transversal slot at its front for guiding a weft thread; a thread gripper accommodated within said shuttle at a bottom section of said slot; spring means connected to said shuttle for urging said thread gripper towards its gripping position; means for displacing said thread gripper from its gripping position against said spring means so as to release said weft thread when said shuttle has left said shed; and drive means for reversing said shuttle along a path outside of said shed, said drive means being arranged along curved sections of said path so as to further said shuttle by contact under the action of centrifugal force and thereby to impart speed to it for being shot across said shed.

24. A high capacity mechanical loom comprising shed forming means for warp threads, a gripping shuttle adapted to circulate through said shed and provided, on one hand, with a transverse slot at its front for guiding a weft thread and, on the other hand, with a longitudinal groove intersecting with said transverse slot, a thread gripper formed as a double-armed lever and accommodated within said longitudinal groove at a bottom section of said slot, spring means connected to said shuttle and adapted to rest upon one arm of said thread gripper so as to urge the other arm thereof against a wall of said slot, stationary means adapted to engage with said longitudinal groove and to abut against said spring-loaded arm for displacing said thread gripper from its gripping position against said spring means so as to release said weft thread when said shuttle has left said shed, rotary means arranged at either end of said shed, flexible circulation means adapted to cooperate with the circumference of said rotary means, said rotary means and said flexible circulation means forming curved guide means for supporting said shuttle outside of said shed and for reversing it so as to circulate with its point ahead, and drive means for setting into motion said rotary means and thereby said flexible circulation means so as to further said shuttle by contact under the action of centrifugal force and thereby to impart speed to it for being shot across the shed.

References Cited in the file of this patent

UNITED STATES PATENTS

| | | |
|---|---|---|
| 720,181 | Salisbury | Feb. 10, 1903 |
| 1,697,155 | Zulueta | Jan. 1, 1929 |
| 1,745,955 | Robinson | Feb. 4, 1930 |
| 2,544,526 | Craymer | Mar. 6, 1951 |
| 2,630,839 | Birtwell | Mar. 10, 1953 |